Figure 15:
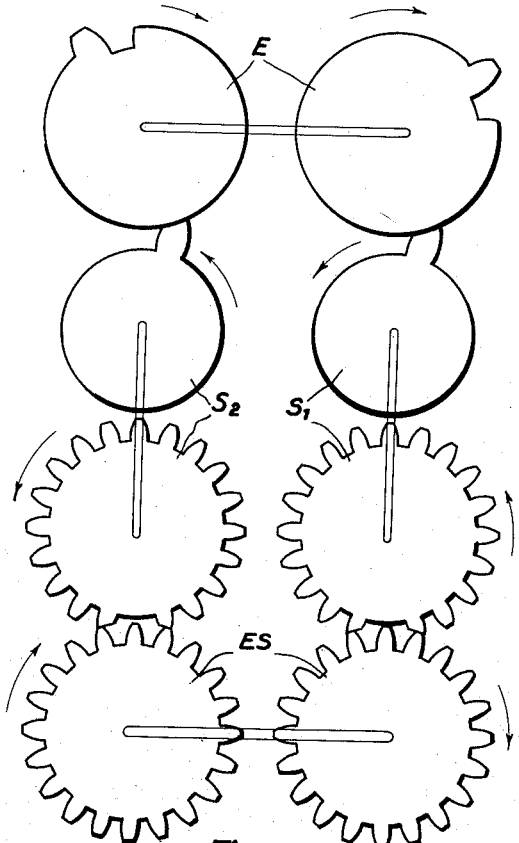

April 11, 1961　M. R. PETIT　2,978,919
MECHANICAL SYSTEM FOR THE CONSTRUCTION OF
CYBERNETICAL MECHANISMS
Filed Aug. 6, 1957　19 Sheets-Sheet 1
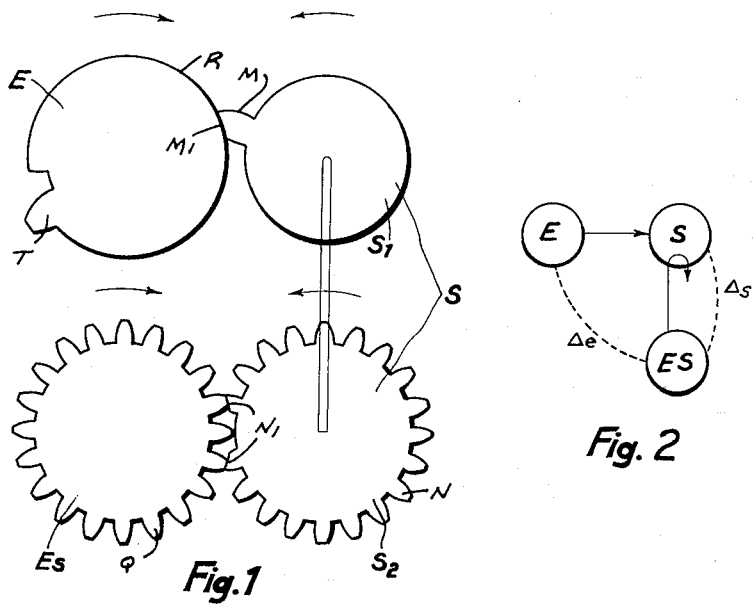
Fig. 1
Fig. 2
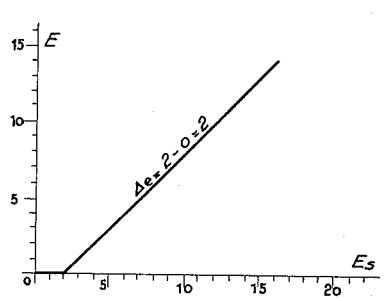
Fig. 3
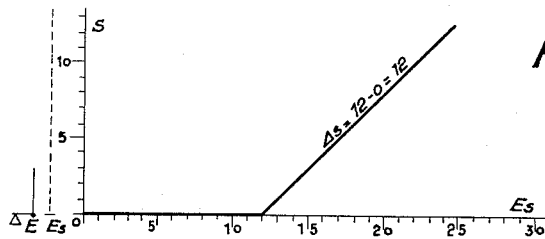
Fig. 4
INVENTOR
Marceau Roger Petit
BY
Pollard, Johnston
Smythe & Robertson
ATTORNEYS April 11, 1961  M. R. PETIT  2,978,919
MECHANICAL SYSTEM FOR THE CONSTRUCTION OF
CYBERNETICAL MECHANISMS
Filed Aug. 6, 1957  19 Sheets-Sheet 2
Fig. 5
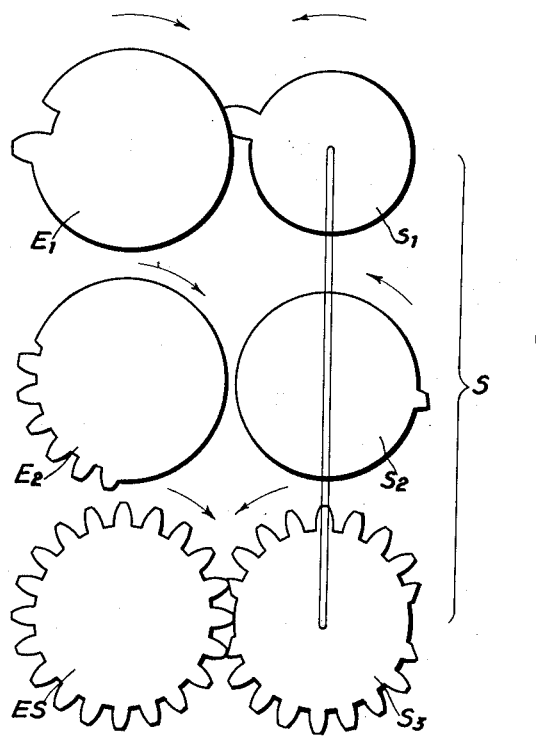
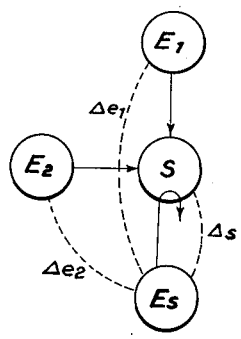
Fig. 6
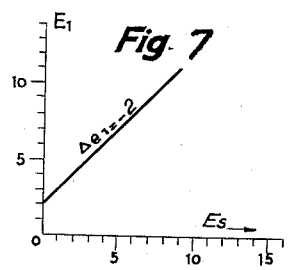
Fig. 7
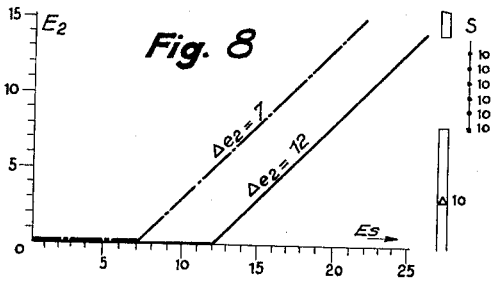
Fig. 8
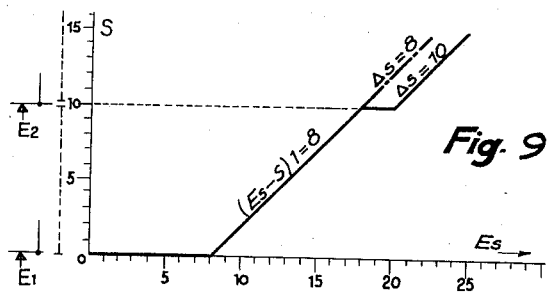
Fig. 9
INVENTOR
Marceau Rogers Petit
BY
ATTORNEYS

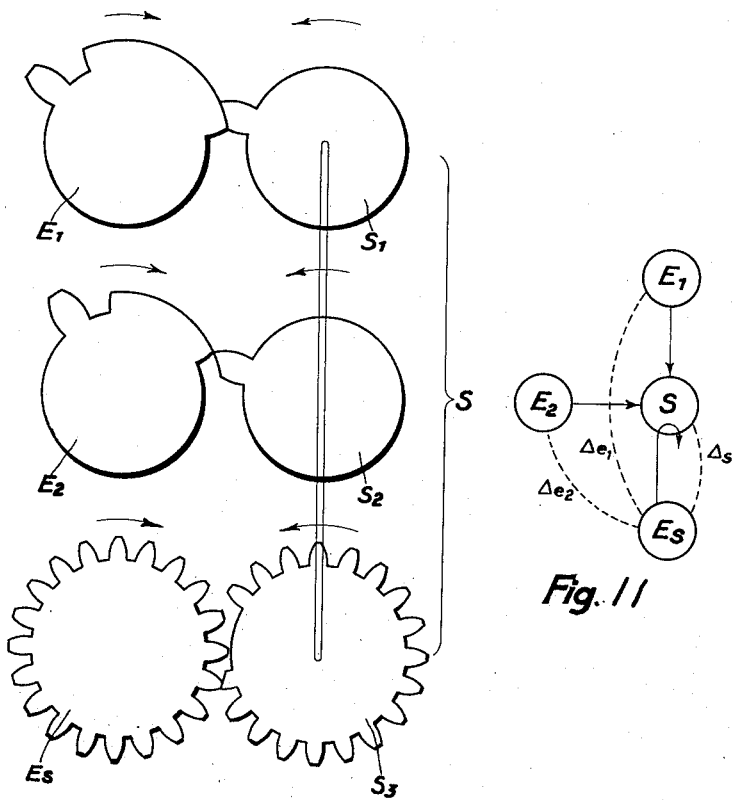
Fig. 10
Fig. 11
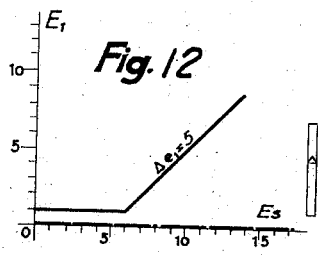
Fig. 12
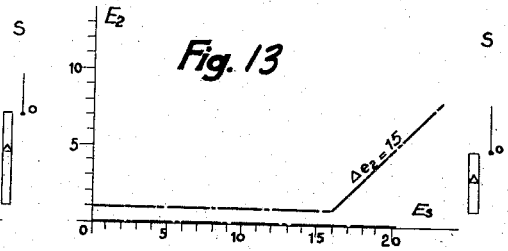
Fig. 13
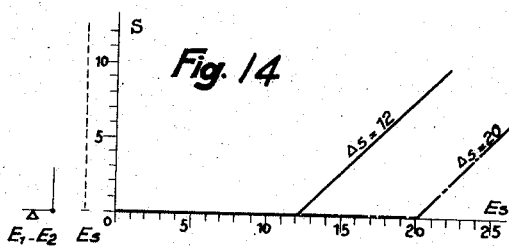
Fig. 14
INVENTOR
Marceau Roger Petit
BY
ATTORNEYS April 11, 1961

M. R. PETIT 2,978,919

MECHANICAL SYSTEM FOR THE CONSTRUCTION OF CYBERNETICAL MECHANISMS

Filed Aug. 6, 1957

19 Sheets-Sheet 4

INVENTOR
Marceau Roger Petit
BY
ATTORNEYS

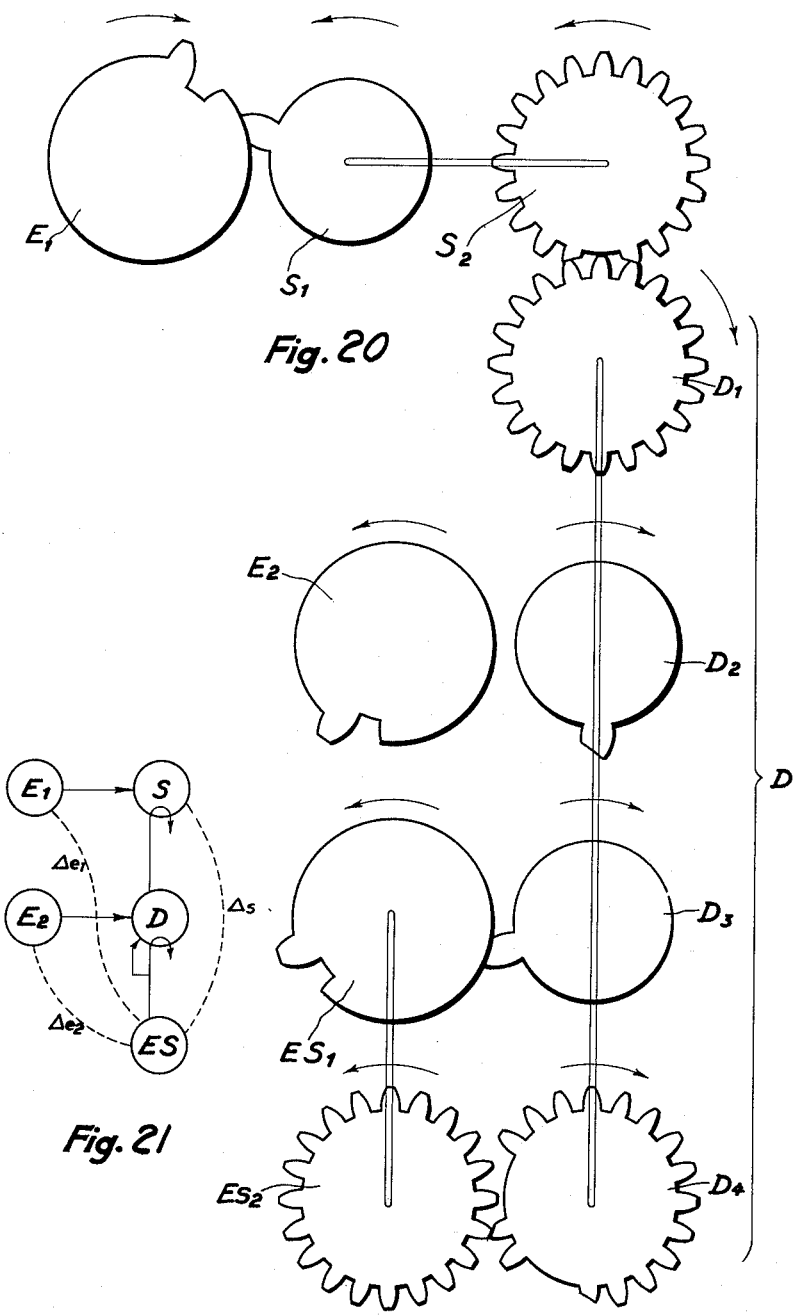

April 11, 1961

M. R. PETIT 2,978,919

MECHANICAL SYSTEM FOR THE CONSTRUCTION OF
CYBERNETICAL MECHANISMS

Filed Aug. 6, 1957

19 Sheets-Sheet 6

INVENTOR
Marceau Roger Petit
BY
ATTORNEYS

April 11, 1961    M. R. PETIT    2,978,919
MECHANICAL SYSTEM FOR THE CONSTRUCTION OF
CYBERNETICAL MECHANISMS
Filed Aug. 6, 1957    19 Sheets-Sheet 7

INVENTOR
Marceau Roger Petit
BY
ATTORNEYS

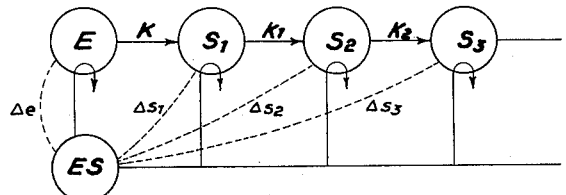
Fig. 32
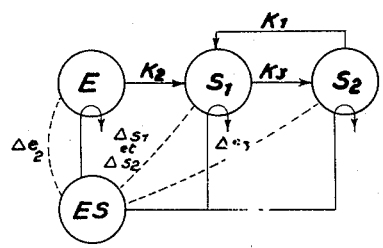
Fig. 33
Fig. 34
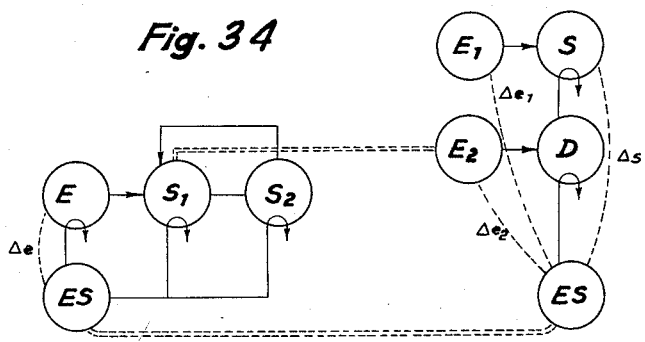
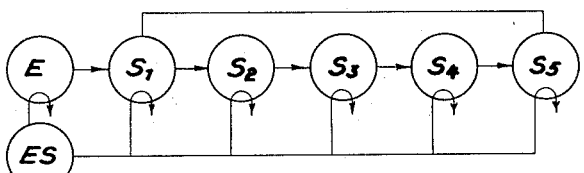
Fig. 35

April 11, 1961

M. R. PETIT 2,978,919

MECHANICAL SYSTEM FOR THE CONSTRUCTION OF
CYBERNETICAL MECHANISMS

Filed Aug. 6, 1957

19 Sheets-Sheet 10

INVENTOR
Marceau Roger Petit
BY
Pollard, Johnston
Smythe & Robertson
ATTORNEYS

April 11, 1961

M. R. PETIT 2,978,919

MECHANICAL SYSTEM FOR THE CONSTRUCTION OF CYBERNETICAL MECHANISMS

Filed Aug. 6, 1957

19 Sheets-Sheet 11

INVENTOR
Marceau Roger Petit
BY
ATTORNEYS

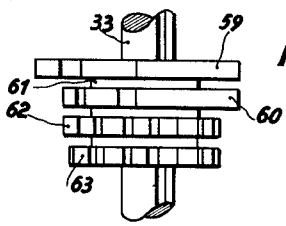
Fig. 42
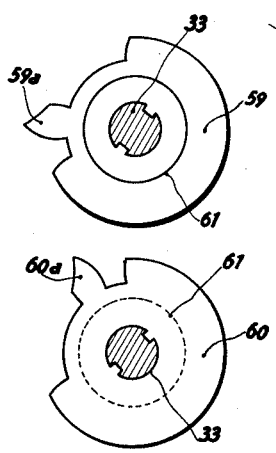
Fig. 43
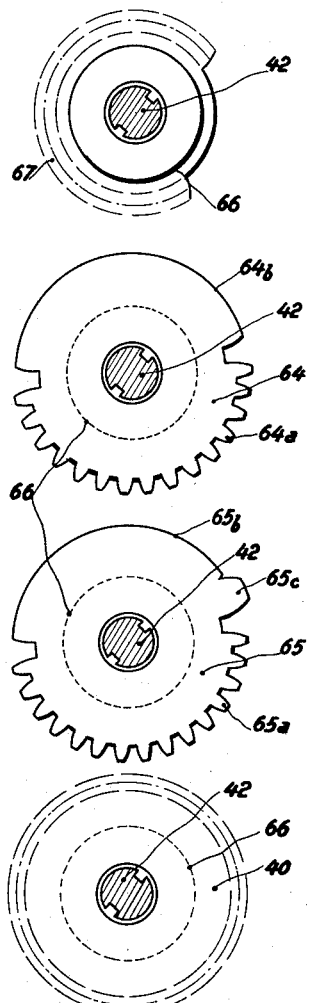
Fig. 45
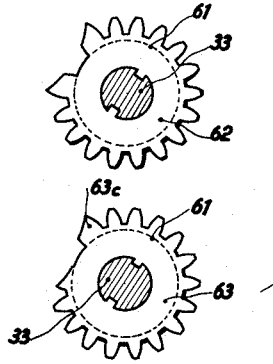
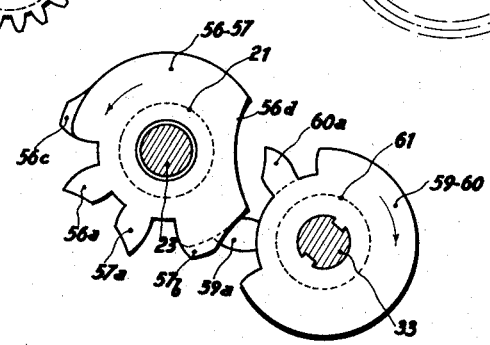
Fig. 44

April 11, 1961 M. R. PETIT 2,978,919
MECHANICAL SYSTEM FOR THE CONSTRUCTION OF
CYBERNETICAL MECHANISMS
Filed Aug. 6, 1957 19 Sheets-Sheet 18

INVENTOR
Marceau Roger Petit
BY
ATTORNEYS

April 11, 1961 M. R. PETIT 2,978,919
MECHANICAL SYSTEM FOR THE CONSTRUCTION OF
CYBERNETICAL MECHANISMS
Filed Aug. 6, 1957 19 Sheets-Sheet 19

INVENTOR
Marceau Roger Petit
BY
ATTORNEYS

United States Patent Office 2,978,919
Patented Apr. 11, 1961

2,978,919

MECHANICAL SYSTEM FOR THE CONSTRUCTION OF CYBERNETICAL MECHANISMS

Marceau Roger Petit, Clichy, France, assignor, by mesne assignments, to Cyber Société Anonyme, Yverdon, Switzerland Filed Aug. 6, 1957, Ser. No. 676,600

Claims priority, application Morocco Nov. 22, 1956

16 Claims. (Cl. 74—435)

The present invention relates to a mechanical system for the production of cybernetic mechanisms for follow-up, control or calculating systems capable of carrying out operations concerned with coded digital informations, representing finite sets, recorded indications and constants of the mechanism.

This system is made up of an assembly of rotary elements to which are applied impulses capable of representing information in the form of mechanical impulses modulated in position and in duration in relation to scale of time, or input reference scale, created in the system and inherent therewith, and which then carry out on the impulses which represent the said information and all intermediate results, one or more of various desired conversions such as: comparison, selection, distribution, numerical, calculation, transfer transposition, implication, or other conversions; and which finally record the results obtained or transmit them to another system in the form of impulses emitted towards the exterior and modulated in position in relation to an output scale, which may be the scale of initial time or a scale subordinate to the initial scale.

Angular movements of pre-determined amplitudes of the said rotary elements form the impulses. These impulses are modulated in position by controlling the instants at which the said elements begin to rotate. These same impulses may be modulated in duration by maintaining the motion of the said elements according to the laws governing the movements of the elements which maintain their motion; these latter movements being themselves capable of forming impulses which can be modulated in position and in duration.

The modulations of position and of duration are effected by the rotary elements acting together momentarily. The elements so acting constitute between each other momentary mechanical circuits.

The modulation of position is effected by co-operation of a non-homokinetic nature, that is by a non-direct, or varying ratio connection, between some of the rotary elements, and the modulation of duration by co-operation of a homokinetic nature, that is by a direct or constant-ratio connection, between some of the elements.

Each system in accordance with the invention includes at least one rotary element that is controlled by at least two other rotary elements. Each controlled element comprises for its control, at least one stopping means or amplitude-limiting means which maintains it in a position of detection, at least one detecting means enabling it to be moved from the said position of detection, and at least one driven means by which it is rotated positively between its successive detecting positions and which enable it to be given a movement of rotation except in its detecting position or positions. At least one of the said other elements comprises, to ensure the control, at least one homokinetic rotary driving means co-operating with the driven means of the controlled member. At least one of the said other elements comprises a locking means co-operating with the stopping means of the controlled element in order to maintain this latter in the detecting position. At least one of the said other elements comprises at least one exciting means co-operating with the detecting means of the controlled element so as to ensure the rotation of the said element out of its detecting position or positions.

Each controlled rotary element carries out the following functions in any system in accordance with the invention.

(a) It can be stopped in at least one control position, known as the detecting position, by at least one other element;

(b) It may receive, in the detecting position, an excitation from another element in order that it can pass through the detecting position;

(c) It may be driven in rotation by at least one element when it is placed in any position whatever, except in a position of detection. This driving in rotation may be considered as the maintenance of the impulse.

The functions (a) and (b) provide the position modulation, while the function (c) ensures the duration modulation.

Each controlled element is thus controlled by at least one homokinetic connection and by at least one non-homokinetic connection, the controlling elements in these two connections being different, and is capable of controlling at least one other element by at least one homokinetic or non-homokinetic connection, the whole of the connections in which one element may take part forming its programme of connections.

The co-operation means are provided on the rotary elements in such manner that the connections (with different elements) follow each other on each controlled element without any discontinuity and at the most with a partial overlap.

The momentary connection means are provided on the rotary elements in order to form mechanical circuits between the said elements, in which circuits the homokinetic connections memorize, during their continuance, the differences of position resulting from the non-homokinetic connections, these memorizations being provided in order to preserve the resultant differences, the time necessary for their participation in the determination of other resultant differences and/or for the emission of results to the exterior of the mechanism.

It is also necessary to state what is meant here by the position of an element and by difference of positions. The position or angular location $\alpha$ of an element is the measure of the angular displacement which exists between a reference mark (real or imaginary) carried by the said element and a fixed initial position, the displacement being measured from the initial position and in a direction of rotation of the element which will be called normal or positive.

In the examples of the invention particularly described hereinafter, the positions of an element are represented by integers, said positions beings separated from each other by an interval which will be called a "step."

The position $p$ of an element may then be determined by the formula:

$$p = \frac{\alpha}{\text{the mean angular value of the step}}$$

the step being measured in the same units as $\alpha$.

In practice, the element carries in a real or imaginary manner, a circumferential scale divided into steps which are separated by graduations which represent positions. Each graduation is marked with the numerical indication of the position which it represents, in order that the position of the element may be immediately readable when the scale is considered with respect to a fixed reference mark.

The difference of positions between two elements which are respectively in positions $p_1$ and $p_2$ at a given moment is expressed by the relation:

$$\Delta = p_1 - p_2$$

If the two elements are in connection, it will be understood that $p_1$ represents the position of the controlling element and $p_2$ the position of the controlled element.

In addition, it should be stated that by initial difference there is meant the difference of position which exists at the beginning of the connection, and by resultant difference, the difference of position which exists at the end of the connection.

Each rotary element, except in the case of an input element, is entirely driven in the interior of the system of which it forms part; it thus constantly participates in at least one connection by which it may be driven.

The means of homokinetic connection carried by each controlled element is arranged in such manner that this connection is possible over at least one range of its position and, at most, over all its positions except one, the cooperating means of homokinetic connection carried by each controlling element being arranged in such manner that the connection is possible for at least one range of its positions, and, at the most, for all its positions. The said means perform the connection when the two elements are in positions at which a connection is possible, and for the whole duration of the said connection the difference of positions is always equal to the initial difference of positions.

The non-homokinetic connection carried by each controlled rotary element is arranged in such manner that the connection is possible in at least one of its positions. The non-homokinetic connection means carried by each controlling element is arranged in such manner that connection may be possible in at least one of its positions and, at the most, in all its positions, the said means being such that, when the two elements are in positions at which connection is possible, the connection takes place and produces between the said elements a resultant difference which is a function of the initial difference, in accordance with the function embodied by the controlling means carried by the controlling element.

The difference between two rotary elements in homokinetic connection obviously remains constant for the entire duration of the said connection whilst the resultant difference between two elements in non-homokinetic cooperation is a function of their initial difference; the said function may be of four kinds which can be taken separately or in combination.

The first kind of function is that for which the resultant difference is constant for all the initial differences.

The second kind of function is that for which the resultant difference is constant for certain initial differences, and is identical with the initial difference for the other initial differences.

The third kind of function is that for which there is one single resultant difference corresponding to one single initial difference.

The fourth kind of function is that for which the difference between the resultant and initial differences depends on the initial difference of the said connection and on a further non-homokinetic connection of one of the first three kinds.

The difference of positions between two elements being the algebraic sum of their differences of positions with respect to any particular third element, a single element may be considered as a reference in evaluating the differences of positions of any desired number of elements.

In the forms of construction of the mechanical system in accordance with the invention, which will be described later by way of example only, the rotary elements are made-up as follows:

The homokinetic connection means are formed on the driving and driven elements by driving members such as teeth of the same circumferential pitch, the pitch of the teeth of two pinions being in full relation with the step of the positions, the said members being able to ensure the drive of the driven element, except at least in the detecting position.

The non-homokinetic connection means are provided on a controlled element by at least one stop member or amplitude-limiting member adapted to co-operate with a locking member of the controlling element in order that the controlled element may be kept in the detection position by the said controlling element; and by at least one detecting member adapted to co-operate with an exciting means of the controlling element so as to ensure the controlling of the controlled element in the detection position.

The non-homokinetic connection means are provided on a controlling element by at least one locking member capable of ensuring the stoppage of the controlled element in the detection position, and by at least one excitation member capable of ensuring the control of the controlled element in the detection position.

The excitation member or members of a controlling element may be provided to produce accelerated starting of the controlled element.

The controlling elements may be provided with locking members which produce decelerated stopping of the controlled element.

A stopping member or amplitude-limiting member is formed by a chamfered projection so as to form a stabilising concave surface adapted to co-operate with at least one locking member of one or a plurality of other elements.

A detection member is constituted by a projection comprising at least one flank adapted to co-operate with at least one flank of at least one excitation member of one or a plurality of other elements.

A locking member is constituted by a cylindrical surface co-operating with the concave surface of the same radius of at least one stopping member of one or more elements.

An excitation member is formed by a projection comprising at least one flank adapted to co-operate with at least one flank of at least one detection member of one or a number of other elements.

A flank of an excitation member carried by an element can ensure a homokinetic drive by co-operation with the flank or flanks of a detection member of one or a plurality of other elements.

A flank of an excitation member carried by an element can have a profile such that it provides accelerated drive by co-operation with the flank or flanks of a detection member of one or a number of other elements.

The locking member may be constituted by a cylindrical surface extended to form a surface having a profile such that it ensures the deceleration of the controlled element by the element carrying the said locking member.

The connection means carried by the elements produce the connection programmes which are possible between elements. As these connections are a function of the introduced and resultant differences of positions, they form between the elements the momentary mechanical circuits required for carrying out the desired operations.

The smallest association of elements which is capable of establishing, between the output elements, differences of positions which have a simple relation to the differences of positions existing between the input elements is called a "group."

A group is characterised by the possibility of connections provided between the elements of which it is formed, and by the kind of non-homokinetic functions. For this reason, there exist several types of groups. The groups of the same type have the same characteristics and effect similar relations between the input differences and the output differences.

In a mechanism, each output element of one group is an input element of at least one other group. The input elements of the system may be the input elements of several groups. The output elements of the system are constituted by the output elements of one or a number of groups. A single element may be common to several groups.

It will be understood that the mechanical system which forms the object of the invention may have a large number of applications, and that the composition of the groups of elements and the form of each of the said elements may be infinitely varied. It is therefore not possible to define them all, as each application requires appropriate combinations between the groups and the elements of which they are composed.

Figure 16:
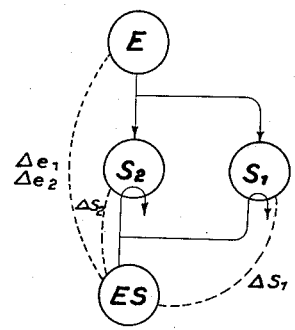
Figure 17:
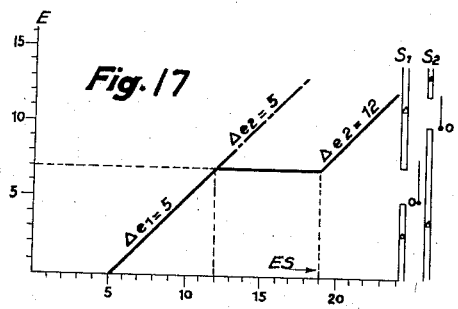
Figure 18:
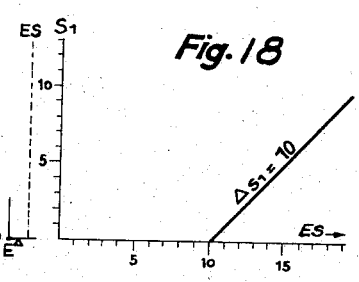
Figure 19:
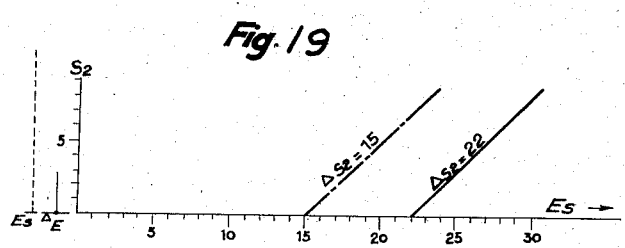
Figure 20A:
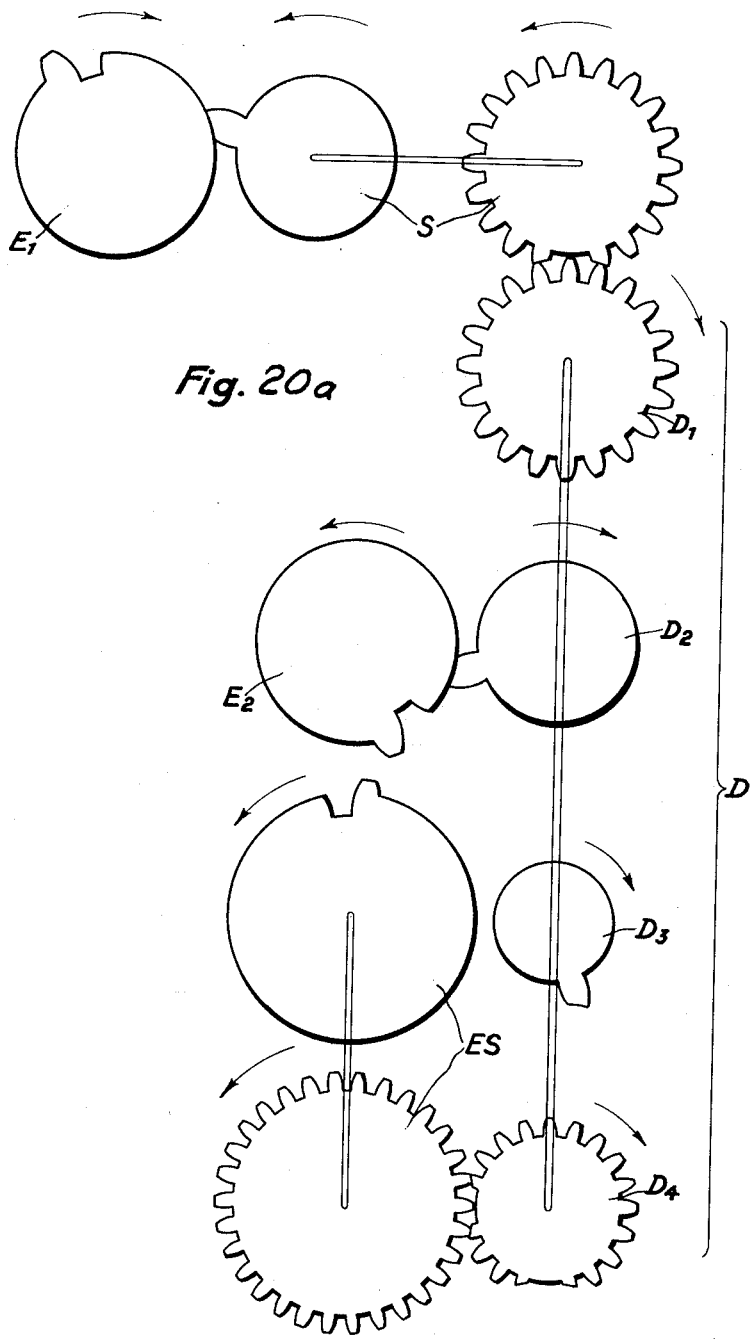
Figure 36:
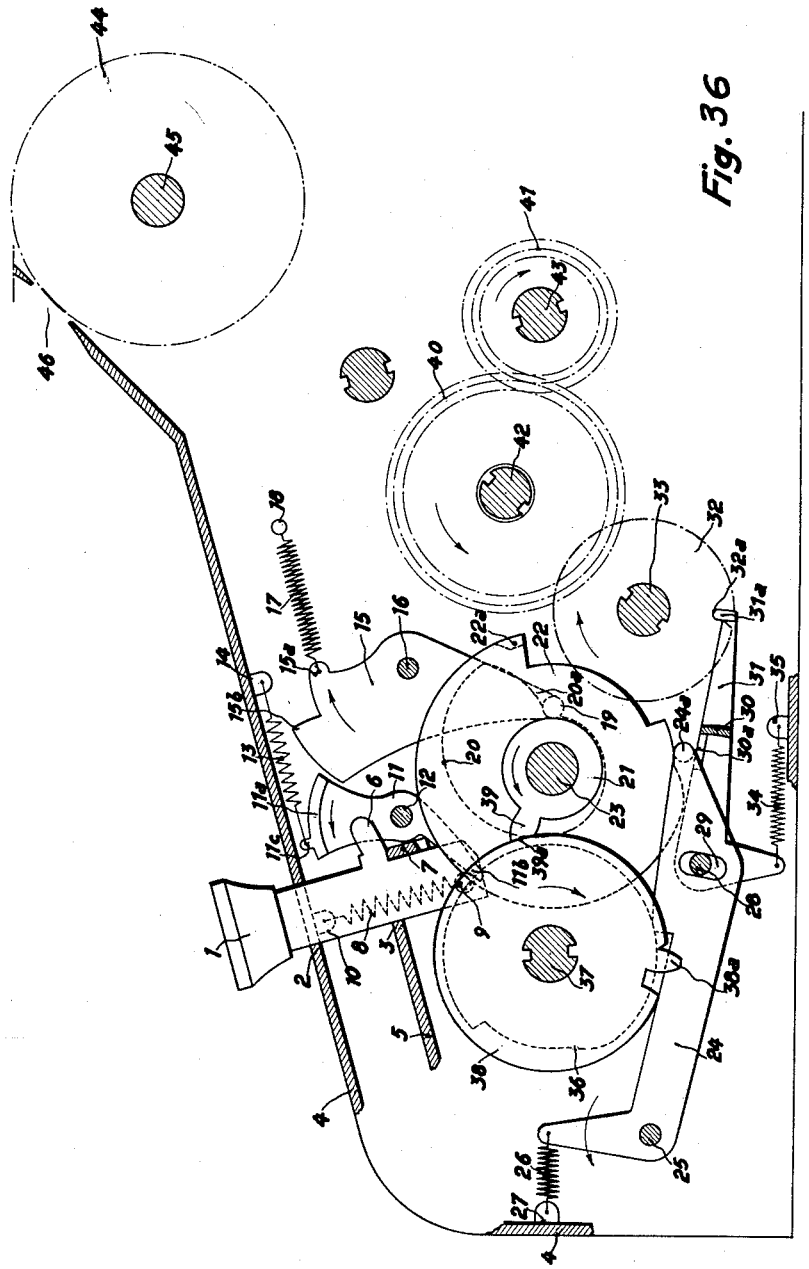
Figure 37:
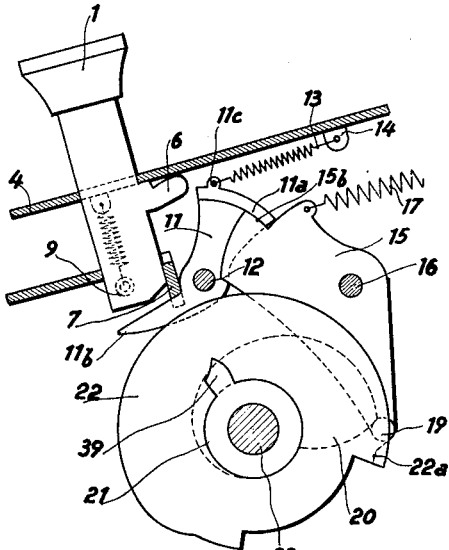
Figure 40:
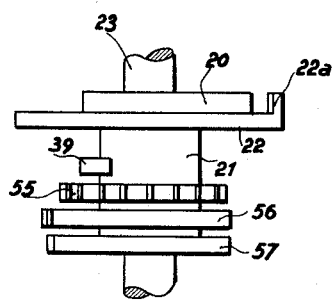
Figure 41:
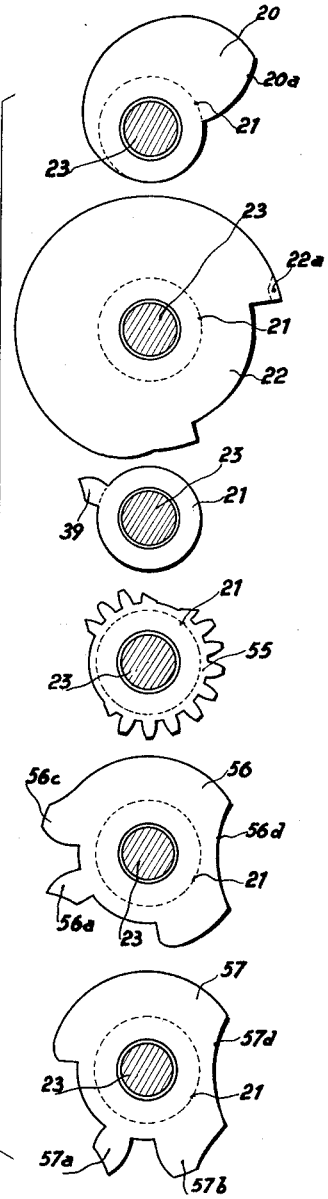
Figure 38:
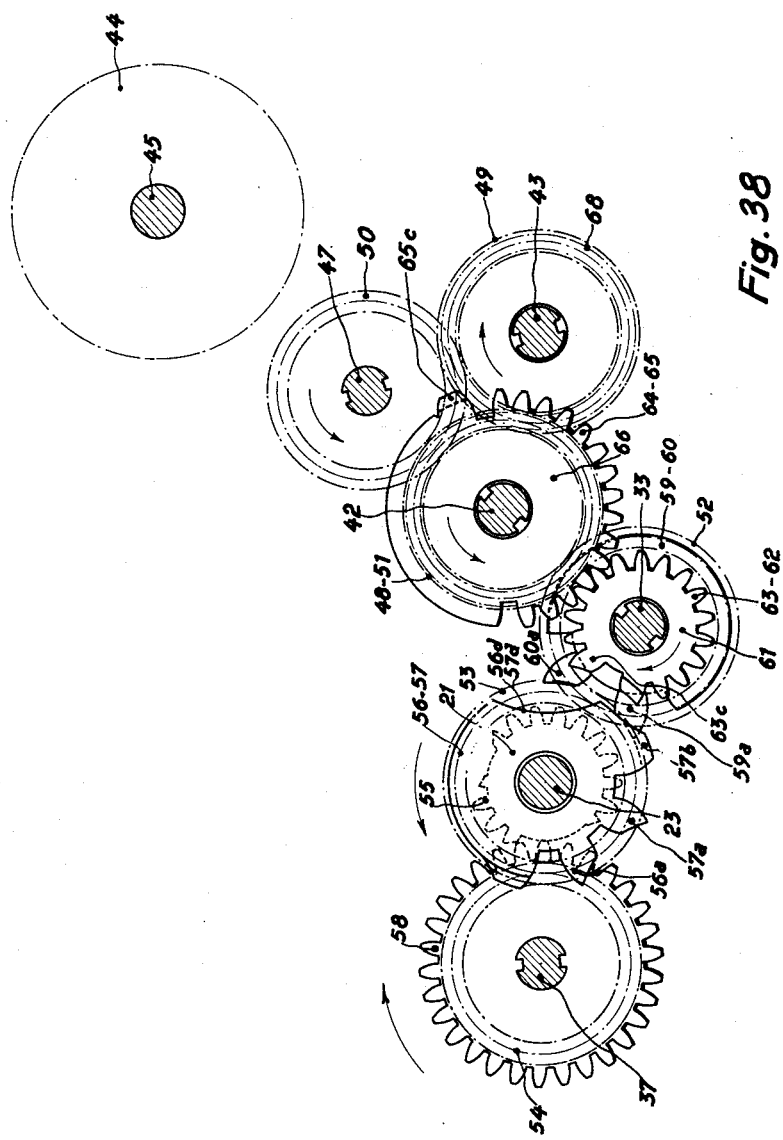
Figure 39:
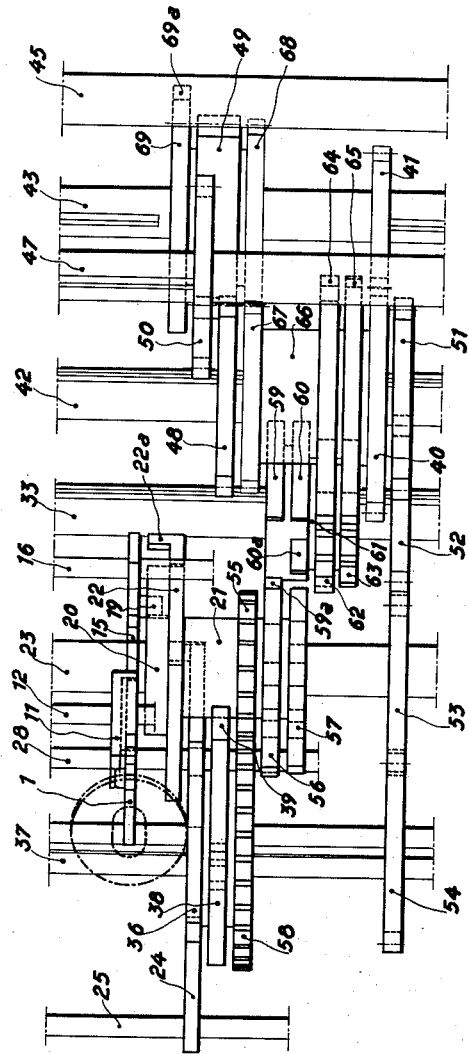
Figure 46:
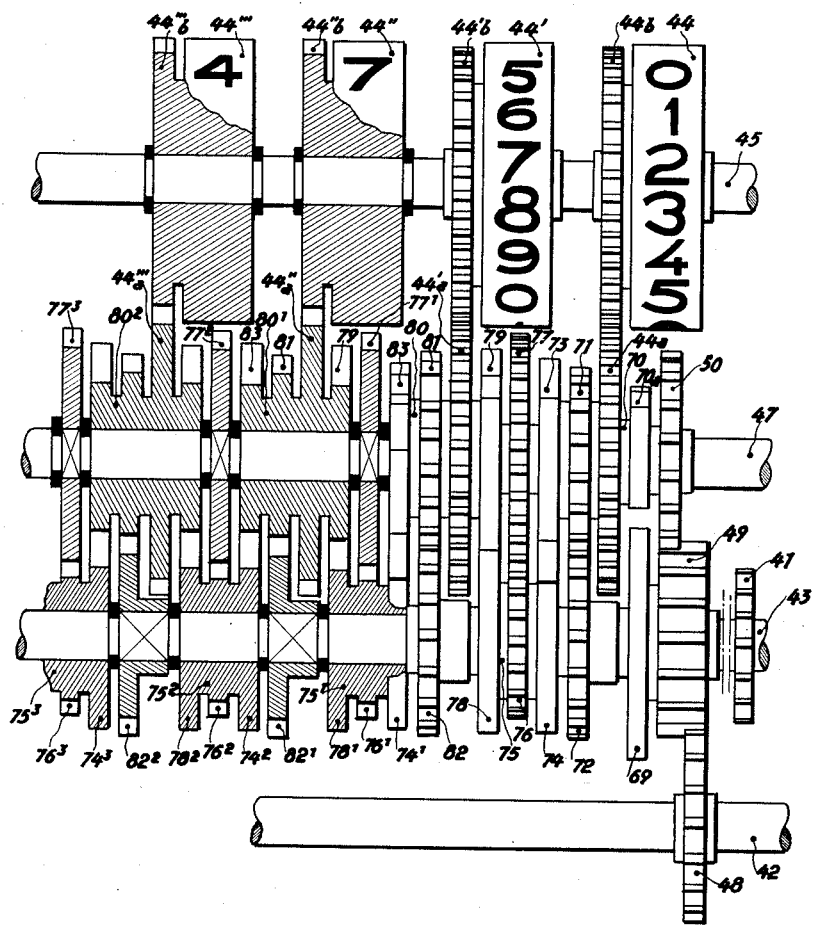
Figure 47:
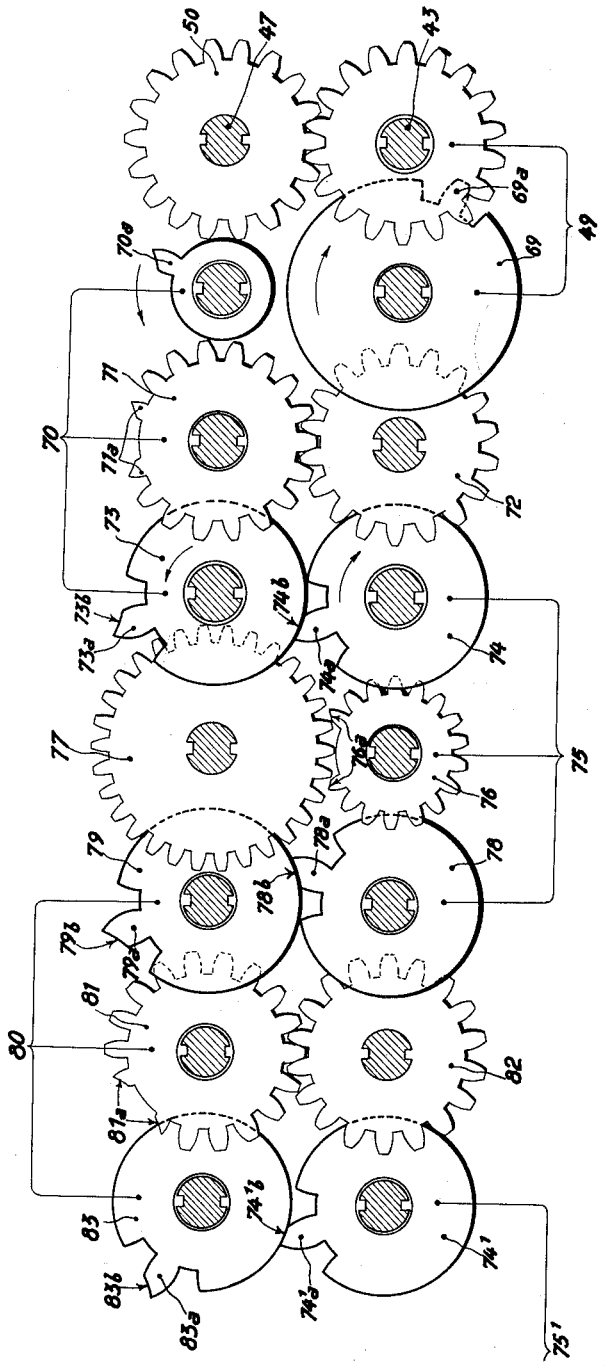

The description gives examples of construction and embodiments of the homokinetic and non-homokinetic connection means in a few of the said groups in their most general forms, without any implied limitation, reference being made to the accompanying drawings, in which:

Fig. 1 shows a group of elements of type A;
Fig. 2 is a diagram which represents symbolically the relations between the elements of the group of type A;
Figs. 3 and 4 are diagrams corresponding to the movements of the constituent elements of the group of type A;
Fig. 5 shows a group of elements of type B;
Fig. 6 is a diagram which shows symbolically the relations between the elements of the group of type B;
Figs. 7 to 9 are diagrams corresponding to the movements of the constituent elements of the group of type B;
Fig. 10 shows a group of elements of type D;
Fig. 11 is a diagram which shows symbolically the relations between the elements of the group of type D;
Figs. 12 to 14 are diagrams corresponding to the movements of the constituent elements of the group of type D;
Fig. 15 shows a group of elements of type E;
Fig. 16 is a diagram which shows symbolically the relations between the elements of the group of type E;
Figs. 17 to 19 are diagrams corresponding to the movements of the constituent elements of the group of type E;
Fig. 20 shows a group of elements of type F;
Fig. 20a shows a group of elements of type G;
Fig. 21 is the diagram which shows symbolically the relations between the elements of the group of types F and G;
Figs. 22 to 26 are diagrams of movements of the constituent elements of the group of type E;
Figs. 27 to 31 are diagrams of the elements of a group of type G;
Fig. 32 is the diagram of a sub-assembly which forms a delay line;
Fig. 33 is the diagram of a sub-assembly which forms a memorizing and repeater system for an indication;
Fig. 34 is the diagram of a sub-assembly forming an addition or subtraction system between a repeated indication and a changing indication;
Fig. 35 is the diagram of a sub-assembly forming a memorizing and repeater system for a sequence of indications;
Fig. 36 shows diagrammatically in cross-section a keyboard which forms the codifying means of a mechanical system produced in accordance with the invention;
Fig. 37 is a partial view of the said keyboard, showing the key system at rest;
Fig. 38 shows diagrammatically a profile cross-section of the inscription device;
Fig. 39 shows a plan view of the device for connection and driving of the shafts of the mechanical system;
Fig. 40 shows a plan view of the transmitter element;
Fig. 41 represents the same transmitter element seen in profile, the members of which it is composed being assumed to be cut and aligned;
Fig. 42 shows a plan view of the receiving element;
Fig. 43 shows a profile view of the receiving element, the members of which it is composed being assumed to be cut and aligned;
Fig. 44 shows the co-operation of the transmitting element with the receiving element;
Fig. 45 shows a profile view of a further element, the members of which it is made-up being separated and aligned;
Fig. 46 shows in elevation and partly in cross-section, a part of a chain of groups of elements which constitute the translating device of the mechanical system in accordance with the invention;
Fig. 47 shows diagrammatically the elements of the said chain which are supposed to be cut and aligned;
Figs. 48 to 56 are diagrams showing the operation of elements of the mechanical system.

In order to provide for the different connections required in the various groups and mechanisms provided according to the invention, use may be made of devices or elements of types heretofore known for use in intermittent gear transmissions, such, for example, as those described in U.S. Patent No. 2,797,589.

ILLUSTRATIVE GROUPS OF ROTARY ELEMENTS

For a better understanding of the invention, a few groups of rotary elements of the more simple type are described, which are capable of carrying out simple relations. All these groups comprise only rotary elements co-operating solely by homokinetic and non-homokinetic connections of kinds which have been described. The necessity of limiting the description has restricted the choice to only seven of these, which are given by way of example and are designated respectively A, B, C, D, E, F and G.

These seven groups are described below with reference to the drawings. In these drawings, the elements which form the groups, when they comprise more than one part, are supposed to be cut between their parts and each of the parts is shown separately.

For the purpose of explanation of the operation of each group, the group is shown symbolically by a diagram which is the diagram of the connections between the elements.

In this connection diagram, a circle represents an element and a line joining two elements indicates a connection. An arrow at the junction of a line and a circle shows that the element represented by the circle is driven and that the connection is of a non-homokinetic type. An arc provided with an arrow, at the end of a line and being the secant of a circle shows that the element represented by the circle is driven and that the nature of the connection is homokinetic.

On the other hand, movement diagrams have been used to show the operation of a group or of a mechanism. A single movement diagram shows the movement of one element with respect to another element taken as a reference, or more generally with respect to a scale of reference, the said scale being in addition itself in relation with at least one element of the group or of the mechanism.

The movement diagram have been prepared in rectangular co-ordinates. The positions of the element or of the scale of reference are plotted as abscissae and the positions of the element considered are plotted as ordinates.

On the movement diagram of an element are shown, in addition to the movements which are the impulses, the necessary complementary indications for following the operation, namely:

In the left-hand margin, the diagrams may comprise symbols which represent the action of the elements which drive the element analysed in the diagram.

In the right-hand margin, similar symbols represent the action of the element analysed on the elements which it drives.

If it is in the left-hand margin, a point represents a detecting member, and if it is in the right-hand margin, an excitation member.

A broken line parallel to the axis of the ordinates represents a maintained means when located in the left-hand margin, and a maintaining means when located in the right-hand margin.

A dash perpendicular to the axis of the ordinates and located in the left-hand margin represents an amplitude-limiting member. If the said member effects the stopping of the element which carries it in the positive direction of rotation of the said member, the said dash is completed by a triangle of which one point or apex, in contact with the said dash, is directed upwards. If the stopping is effected in the negative direction, the point is directed downwards, and if the stopping is provided for both directions of rotation, both triangles are shown.

A continuous double line parallel to the axis of the ordinates and located in the right-hand margin, represents a locking member. A triangle centered on the said double line indicates the direction of rotation of the co-operating controlled element for which stopping is provided. A point of the triangle directed upwards means that the controlled element is capable of being stopped for its positive direction of rotation, while the point directed downwards means that the controlled element can be stopped for its negative direction of rotation. Stopping in both directions is indicated by the presence of the two triangles.

Each symbol is placed opposite the position or positions for which the element which carries the corresponding means can co-operate with a means of another element. The position or positions of this further element for which the latter can co-operate are shown at the side of the said symbol. At the upper or lower part of the vertical marginal section, provided for one or a number of symbols, is given the indication of the element which can co-operate with the means represented by the said symbol or symbols, and this in the case in which there are a number of driven elements.

GROUP OF THE TYPE A

This group is the smallest association possible between three elements; it enables the impulses to be modulated in position and in duration. It employs a homokinetic connection and a non-homokinetic connection. It constitutes a link which is present in all the groups illustrated. The diagram of this group is shown in Fig. 2, while Fig. 1 shows an example of embodiment of it in which the non-homokinetic connection carries out a function of the first type.

This example comprises an input element E, a common input and output element ES and an output element S. The input element E drives the output element S through a non-homokinetic connection of the first type with the section or part $S_1$ of the said output element S, giving a resultant difference of:

$$(E-S)_r = K$$

The element ES to which is imparted a movement of rotation acts as a driving means and drives the output element S through the homokinetic connection with the section or part $S_2$ of this element. This connection is possible for all positions of the element S, except in the position in which it is stopped by the element E.

Referring more particularly to the mechanical action of the group of elements shown in Fig. 1:

The cylindrical surface R of the input or controlling element E of the non-homokinetic connection constitutes a locking member which cooperates with the stopping means on element S, i.e., with the complementary concave surface $M_1$ of the projection M on part $S_1$ of element S, so as to stop the rotation of element S in a definite detecting position of the latter. When element S is in that stopped or detecting position, as it is seen in Fig. 1, the projection M thereof constitutes a detection member so positioned that upon the rotation of element E one of the flanks of the projection or tooth T on element E, which constitutes an excitation member on the input or controlling element, will engage a flank of projection M and drive the part $S_1$, hence the element S as a whole, out of the stopped position.

As seen in the lower part of Fig. 1, the driving element E$s$ of the elements in homokinetic connection is formed with a complete circumferential series of pinion teeth. The driven part $S_2$ of those elements is formed with a series of teeth N which have the same circumferential pitch as the teeth Q. The teeth N, however, are interrupted circumferentially to provide a gap bordered by two cut-away teeth having surfaces $N_1$ that slope oppositely on an arc which, when element S is in its stopped position, lies contiguous to the circular path described by the ends of the teeth Q of element E$s$.

Thus, when the element S is in or reaches its detecting or stopped position, the rotation of the driving element E$s$ has no influence on it; but the teeth of part $S_2$ are then so located that they will be engaged and driven by the teeth of element E$s$, so as to rotate element E in homokinetic connection, upon any angular displacement of element S from that position. Therefore, at the moment of the excitation or starting of element S by the action of the projection T of element E upon the detection member (projection M) of part $S_1$, the resulting angular displacement of element S starts the positive driving of that element by element E$s$. Such driving then continues to produce a definite further displacement of the element S, until the stopping means at $M_1$ again engages the locking surface at R.

Considering the differences in position of the elements E, S and ES, which positions have been assumed due to the rotation $r$, we have:

$$(E-S)-(ES-S)+(ES-E)=0$$

(1A)   or $$(ES-S)=(ES-E)+(E-S)$$

At the end of the non-homokinetic connection period which coincides with the beginning of the homokinetic connection period, we have:

$$(E-S)=(E-S)_r=K$$

from which, following (1A):

(2A)   $(ES-S)=(ES-E)+K$

This formula can be written:

(3A)   $\Delta_s = \Delta_e + K$ in which $\Delta_s$ represents the output difference and $\Delta_e$ the input difference.

In the case in which the non-homokinetic connection is of the first type, this kind of group enables an output difference to be obtained equal, except for a constant, to the input difference. $\Delta_s$ exists for the whole duration of the homokinetic connection between the elements S and ES and is therefore registered.

The existence of $\Delta_e$ may be transient, since the necessity of this existence only arises, for the resultant value of $\Delta_s$, at the moment of the exchange of connection on the element S, that is to say at the moment when the element E starts up the element S in order that the latter may be driven by the element ES.

Figs. 3 and 4 are diagrams of the element E and S in the example of embodiment of the group A shown in Fig. 1. Only one case of operation is shown on these diagrams, that in which $\Delta_e$ equals 2.

From the diagram of Fig. 3, which relates to the movement of the input element E with respect to the input-output element ES, it can be seen that the driving element E is started up from its zero position when the driving element ES is in the position 2.

The input difference is thus: $\Delta_e = 2 - 0 = 2$.

It can be seen from the right-hand margin that this element E stabilises the output element S in the position of detection (zero) for its positions from 12 to 10 passing through 0, and that in the position 10 it starts-up the element S.

The diagram of Fig. 4 relates to the movement of the output element S with respect to that of the input-output element ES.

It can be seen from the left-hand margin that the element S is stabilised by the element E in its position of detection zero, and is started up by this element E when the element ES passes through the position 12. After starting, the element S is driven homokinetically by the element ES. At this moment, the output difference is: $\Delta_s = 12 - 0 = 12$.

In fact, the resultant difference K of the non-homokinetic connection of the first type between the elements E and S is the difference in their position when the element S is in the position of detection (zero) and when the element E is in the position at which it excites the element S (10). This difference is thus: $10 - 0 = 10$. By applying Formula 3A, there is obtained:

$$\Delta_s = \Delta_e + K = 2 + 10 = 12$$

$\Delta_e$ represents the impulse carried by the input element E, the control of which is external to the group considered.

$\Delta_e$ has as many different values as there are different sets of information to be represented. $\Delta_s$ represents the output impulse, and its value differs from that of $\Delta_e$ by a constant. In the example shown, the impulse of the element S begins at 12 from the scale of reference measured by the element ES; if the value of $\Delta_e$ had been 3 instead of 2, the impulse of the element S would have begun at 13 on the scale, etc. The moment of the scale at which an element starts by an impulse being the position of the said impulse, it can be seen that by a non-homokinetic connection, the impulse of the element E modulates the impulse of the element S in position.

GROUP OF THE TYPE B

The group of the type B provides for the selective transmission of the impulses. It comprises two input elements $E_1$ and $E_2$ (see Figs. 5 and 6), a common input and output element ES, and an output element S having a number of units.

The input element $E_1$ drives the output element S through a non-homokinetic connection of the first type with the unit $S_1$ of this latter, thus giving a resultant difference $K_1$, namely:

$$(E_1 - S)_r = K_1$$

The input element $E_2$ drives the output element S through a non-homokinetic connection of the second type with the unit $S_2$ of this latter, thus giving the resultant difference $(E_2 - S)_r$ as follows:

$$(E_2 - S)_r = K_2 \text{ if } (E_2 - S)_i \leq K_2$$

and $$(E_2 - S)_r = (E_2 - S)_i \text{ if } (E_2 - S)_i \geq K_2$$

The element ES drives the element S by a first homokinetic connection with the unit $S_3$ of this latter, which connection follows on the element S the non-homokinetic connection with the element $E_1$ and precedes the non-homokinetic connection with the element $E_2$. The element ES also drives the element S by a second connection which follows, on that element, the non-homokinetic connection with the element $E_2$.

$(ES-S)_1$ is the difference between the positions of the elements S and ES during the first homokinetic connection.

$(ES-S)_2$ is the difference between the positions of the element S and ES during the second homokinetic connection.

When considering the differences of positions, the operation is as follows:

With reference to Equation 2A, we can write:

(1B) $\qquad (ES-S)_1 = (ES-E_1) + K_1$

When the element S, driven by the element ES, comes into co-operation with the element $E_2$, the initial difference between the elements $E_2$ and S is:

(2B) $\qquad (E_2-S)_1 = (ES-S)_1 - (ES-E_2)$ from which, by using (1B):

(3B) $\qquad (E_2-S)_1 = (ES-E_1) - (ES-E_2) + K_1$

In the circuit $E_2$, S, ES, $E_2$, when, leaving the connection between the elements $E_2$ and S, the latter element co-operates with ES through the second homokinetic connection, we have:

$$(E_2-S)_r - (ES-S)_2 + (ES-E_2) = 0$$

(4B) $\qquad (ES-S)_2 = (ES-E_2) + (E_2-S)_r$ from which, taking for $(E_2-S)_1$ the value given by (3B):

(5B) $\qquad (ES-S)_2 = (ES-E_2) + K_2$ if $$(ES-E_1) - (ES-E_2) + K_1 \leq K_2$$

(6B) $\quad (ES-S)_2 = (ES-E_2) + (ES-E_1) - (ES-E_2) + K_1$ if $$(ES-E_1) - (ES-E_2) + K_1 \geq K_2$$

or $$(ES-S)_2 = (ES-E_1) + K_1$$

or again by putting $$\Delta_{e1} = (ES-E_1)$$
$$\Delta_{e2} = (ES-E_2)$$
$$\Delta_{s1} = (ES-S)_1$$
$$\Delta_{s2} = (ES-S)_2$$

(7B) $\qquad \Delta_{s2} = \Delta_{e2} + K_2$ if $$\Delta_{e1} - \Delta_{e2} \leq K_2 - K_1$$

(8B) $\qquad \Delta_{s2} = \Delta_{e1} + K_1$ if $$\Delta_{e1} - \Delta_{e2} \geq K_2 - K_1$$

(9B) $\qquad \Delta_{s1} = \Delta_{e1} + K_1$

The group of this type enables an output difference to be obtained from two input differences which is equal, except for a constant, to either one or the other of the input differences, depending on whether the difference between the two input differences is greater or less than a given constant of comparison.

The diagrams of Figs. 7, 8 and 9 indicate the movement of the elements for one case of operation: that in which:

$$\Delta_{e1} = -2$$

and $$\Delta_{e2} = 7 \text{ or } 12$$

Fig. 7 shows the movement of the input element $E_1$, Fig. 8 the movement of the input element $E_2$, and Fig. 9 the movement of the output element S, all these movements being given with respect to that of the input and output element ES.

In Fig. 7, it can be seen that the input element $E_1$ has a movement such that it passes into its position 2 when the element ES is in the position zero. The input difference $\Delta_{e1}$ thus has the negative value of $-2$. In the right-hand margin, it is seen that the element $E_1$ stabilises the output element S in the zero position of the latter, at is positions from 12 to 10, passing through 0, and that at its position 10 it starts up the element S.

In Fig. 8, two examples are shown of the drive of the input element $E_2$, one shown in full lines and the other in chain-dotted lines. In the case shown in full lines, the element $E_2$ passes through its zero position when the element ES is in position 12, and the input difference $\Delta_{e2}$ is then equal to 12. In the case shown in chain-dotted lines, the element $E_2$ passes through its zero position when the element ES is in position 7; the input difference $\Delta_{e2}$ is then equal to 7.

In the right-hand margin, it is seen that $E_2$ stabilises the element S in the position 10 of the latter element, when the element $E_2$ occupies all its positions except those for which it is provided with an excitation member and is able, at each of these positions, to drive the element S when the latter is brought into the detection position.

The stabilisation or stopping of the element S by the element $E_2$ is thus applied in the example shown in Fig. 5 up to the position 7 of the element $E_2$, and the drive of S by $E_2$ can be effected in one of the positions 8 to 13, since the element $E_2$ comprises six teeth.

Fig. 9 shows in the left-hand margin that the output element S is stopped and maintained in its zero position, and is started up by the input element $E_1$, after which it is driven up to its position 10 by the element ES.

In this position, two cases can arise:

In one case, shown in full lines on the diagram, the element S is stopped at position 10 and is started up by the element $E_2$, after which it is driven by the element ES. In the other case, shown in chain-dotted lines on the diagram, the element $E_2$ is in the starting position and enables the element S to cross over its detection position without stopping.

The diagram shows that the element S passes through the position 0 when the element ES is in position 8 and arrives at 10 when the element ES is in position 18.

In the first case considered (full lines) the input element $E_2$ stops the element S between positions 18 to 20 of the element ES, after which the element $E_2$ starts up the element S at the position 20 of the element ES which then again drives the element S homokinetically.

In the second case (chain-dotted lines) the input element $E_2$ ensures the passage of the position 10 of the element S at its position 10.

$K_1$ is equal to $(E_1-S)_r$ or, in the example shown, $10-0=10$.

$K_2$ is equal to $(E_2-S)_r$ or, in the example shown: $8-10=-2$.

In the first case, the output difference will be:

$$\Delta_s=\Delta_{e2}+K_2$$

because $$\Delta_{e1}-\Delta_{e2}\leqq K_2-K_1$$

therefore $$\Delta_s=12-2=10$$

In the second case, the output difference is:

$$\Delta_s=\Delta_{e1}+K_1$$

because $$\Delta_{e1}-\Delta_{e2}\geqq K_2-K_1$$

therefore $$\Delta_s=-2+10=8$$

It should be observed that:

(a) The existence of $\Delta_{e1}$ is only necessary at the moment of the formation of $\Delta_{s1}$;
(b) The existence of $\Delta_{e2}$ is only necessary at the moment of formation of $\Delta_{s2}$;
(c) The existences of $\Delta_{e1}$ and $\Delta_{e2}$ do not require to be simultaneous.

GROUP OF THE TYPE C

This kind of group is similar to that of type B, except that the non-homokinetic connection between the input element $E_2$ and the output element S is of the first type and gives:

$$(E_2-S)_r=K_2$$

This group provides the control of a transmission, an implication or an orientation. It produces a convergent cross-roads.

In this case, we always have:

(1C)  $\Delta_{s1}=\Delta_{e1}+K_1$
(2C)  $\Delta_{s2}=\Delta_{e2}+K_2$

It will be noted that $\Delta_{s2}$ can only exist if $\Delta_{s1}$ has previously existed.

The group of this type enables the existence of a connection to be conditioned to the previous existence of another connection, that is to say it enables the opening and closing to be controlled of a transmission circuit, in the same way as a switch.

GROUP OF THE TYPE D

The group of this type effects a conjunction, and may constitute a convergent cross-roads between at least the two channels formed by two input elements $E_1$ and $E_2$, for which it serves as a switching means to a single output element.

It comprises two input elements $E_1$ and $E_2$ (Figs. 10 and 11), a common input and output element ES, and an output element S with three units $S_1$, $S_2$ and $S_3$.

The input element $E_1$ drives the output element S (unit $S_1$) by a non-homokinetic connection of the first type, which gives a resultant difference $(E_1-S)_r=K_1$, this connection not being possible for at least one position of the element $E_1$.

The input element $E_2$ drives the output element S (unit $S_2$) through a non-homokinetic connection of the first type, which gives a resultant difference $$(E_2-S)_r=K_2$$

this connection not being possible for at least one position of the element $E_2$.

The input and output element ES co-operates with the unit $S_3$ of the element S by a homokinetic connection.

The operation of this group is as follows:

Referring to the Equation 3A, we can write:

(1D)  $\Delta_s=\Delta_{e1}+K_1$ in the case in which the connection is established between $E_1$ and S;

(2D)  $\Delta_s=\Delta_{e2}+K_2$ in the case in which the connection is established between $E_2$ and S.

It will clearly be understood that the input differences which are simultaneously present must be such that the element S is only subjected to compatible actions. For example, the input element $E_1$ cannot start up the output element S while $E_2$ stops the said element S.

This group enables a difference to be obtained between two output elements which is equal, except for a constant, to an input difference which can be produced by any one element of a number of input elements.

The diagrams of Figs. 12 to 14 illustrate two cases of operation of a group of this kind, one being shown in full lines and the other in chain-dotted lines.

The diagram of Fig. 12 relates to the movement of the input element $E_1$, and that of the Fig. 13 to the movement of the input element $E_2$, and that of the Fig. 14 to the movement of the output element S, all these movements being taken with respect to the movement of the element ES.

In the right-hand margin of the diagram of Fig. 12, it is seen that this input element $E_1$ stops the output element S at the position 0 for the positions 1 to 7 of the element $E_1$. In the position 7, the element $E_1$ is provided with an excitation member which is able to start up the element S from its position 0.

In the right-hand margin of the diagram of Fig. 13 it can be seen that the input element $E_2$ stops the output element S in the position 0 for the positions 1 to 5 of the element $E_2$. In position 5, the element $E_2$ is capable of starting up the element S in position 0.

In the left-hand margin of the diagram of Fig. 14, it can be seen that the element S is stopped at its zero position by the two input elements $E_1$ and $E_2$, and can be started up from the said position by $E_1$ or $E_2$, after which it is homokinetically driven by the element ES.

Fig. 14 also shows that, depending on the action of one or the other of the input elements $E_1$ and $E_2$, the movement of the output element S with respect to that of the element ES can be that shown in full lines or that shown in chain-dotted lines.

In the case corresponding to the full line diagram, the element $E_1$ is at position 1 in which it stops the element S; the element $E_2$ is in position 0 and has no action. When the element $E_1$ starts with, for example, $\Delta_{e1}=5$, it starts up the element S at the position 12 of the scale, and the element S thus starts with $\Delta_s=12$.

In the case corresponding to the dotted line diagram, the element $E_1$ is in the position 0 and has no action; the element $E_2$ is at position 1 and stops the element S in position 0. When the element $E_2$ starts, for example with $\Delta_{e2}=15$, it starts up the element S at position 20 of the scale and thus this element starts with $\Delta_s=20$.

GROUP OF THE TYPE E

The group of this type constitutes a divergent crossroads between a single input element and at least two output elements.

In the example shown in Figs. 15 and 16, the group comprises an input element E with two units, and an input and out-put element ES with two units, and two output elements $S_1$ and $S_2$, each of which comprises two units.

The input element can drive the output element $S_1$ by a non-homokinetic connection of the first type giving a resultant difference $(E-S_1)_r=K_1$.

The input element E can drive the output element $S_2$ by a non-homokinettic connection of the first type giving a resultant difference $(E-S_2)_r=K_2$.

The element ES drives the output element $S_1$ by a homokinetic connection which follows the non-homokinetic connection between the element $S_1$ and the element E.

The element ES can drive in the same way the output element $S_2$ by a homokinetic connection which follows the non-homokinetic connection between the element $S_2$ and the element E.

$\Delta_{e1}$ is the input difference $(ES-E)$ when the element E produces the resultant difference $K_1$ on the element $S_1$.

$\Delta_{e2}$ is the input difference $(ES-E)$ when the element E produces the resultant difference $K_2$ on the element $S_2$.

$\Delta_{s1}$ is the difference $(ES-S_1)$ when the elements ES and $S_1$ are in homokinetic connection.

$\Delta_{s2}$ is the difference $(ES-S_2)$ when the elements ES and $S_2$ are in homokinetic connection.

The operation of this group can be summarized with reference to the Equation 3A as follows:

(1E)
$$\Delta_{s1}=\Delta_{e1}+K_1$$
$$\Delta_{s2}=\Delta_{e2}+K_2$$

This type of group enables output differences to be obtained on different output elements, which are each equal, except for a constant, respectively to the input differences which are successively carried by a single input element.

The operation for a value of $\Delta_{e1}$ and for two values of $\Delta_{e2}$ is illustrated by the diagrams of Figs. 17 to 19 which relate to the example of Fig. 15.

The diagram of Fig. 17 which relates to the movement of the input element E, shows that this element passes to zero when the element ES is at position 5, the input difference being then $\Delta_e=5$, and that it may either continue its rotation (dotted lines) or be stopped at position 7 (full lines) so as to start up again when the element ES is at position 19, so as to give the differences respectively:

$$\Delta_{e2}=5 \text{ and } \Delta_{e2}=12$$

In the right-hand margin, it can be seen that the element $S_1$ is stabilised in the zero position for the positions 7 to 5, passing through 0, of the element E, and that the position 5 of the element E is that at which this element starts up the element $S_1$.

The element $S_2$ is stabilized at the zero position for the positions 12 to 10, passing through 0, and at the position 10 of the element E, the latter starts up the element $S_2$.

The diagram of Fig. 18 relating to the movement of the output element $S_1$ shows in the left-hand margin that the element $S_1$ is stopped in the zero position and is started up from this position by the element E, after which it is driven homokinetically by the element ES with the output difference:

$$\Delta_{s1}=\Delta_{e1}+K_1=5+5=10$$

The diagram of Fig. 19 relating to the movement of the output element $S_2$ shows two cases of operation.

In the first case, shown in chain-dotted lines, the element $S_2$ is stopped in the zero position by the element E and started up by that element when the element ES is in position 15, after which it is driven in homokinetic connection by the element ES.

I nthe second case, shown in full lines, the element $S_2$ is stabilised in position 0 by the element E and is started up by that element when the element ES is in position 22, after which it is driven in homokinetic connection by the element ES.

It is verified that in the first case:

$$\Delta_{s2}=\Delta_{e1}+K_2=5+10=15$$

and that in the second case:

$$\Delta_{s2}=\Delta_{e2}+K_2=12+10=22$$

GROUP OF THE TYPE F

The group of this type constitutes a group of the addition type.

In an example of this group shown in Figs. 20 and 21, the group comprises two input elements $E_1$ and $E_2$, an output element S with two units $S_1$ and $S_2$, a common input and output element ES with two units $ES_1$ and $ES_2$, and an intermediate element D comprising four units $D_1$, $D_2$, $D_3$ and $D_4$.

The element $E_1$ drives the element S (unit $S_1$) by a non-homokinetic connection of the first type giving a resultant difference:

$$(E_1-S)_r=K_1$$

The element $E_2$ drives the intermediate element D by a non-homokinetic connection of the first type with the unit $D_2$ of the latter element, giving a resultant difference of $$(E_2-D)_r=K_2$$

The element D drives by its unit $D_1$, the element S (unit $S_2$) through a homokinetic connection.

The element ES (unit $ES_2$) drives the element D by two homokinetic connections with the unit $D_4$ and by a non-homokinetic connection of the first type (unit $ES_1$) with the unit $D_3$ of the element D, giving a resultant difference $(ES-D)_r=K_3$.

$(ES-D)_1$ is the difference between the elements ES and D during the first homokinetic connection.

$(ES-D)_2$ is the difference between the elements ES and D during the second homokinetic connection.

The connections which are established with the element D follow each other in the following order:

Non-homokinetic connection with the element ES;
First homokinetic connection with the element ES;
Non-homokinetic connection with the element $E_2$;
Second homokinetic connection with the element ES.

The homokinetic connection between the elements S and D begins to exist while the first homokinetic connection is still in being between the elements ES and D, and still exists at least during a part of the existence of the second homokinetic connection between the elements ES and D.

The operation of this group is as follows:

The non-homokinetic connection between the elements ES and D gives a resultant difference $(ES-D)_r = K_3$, which is maintained constant during the whole duration of the first homokinetic connection between these two elements. We have therefore:

$$(ES-D)_1 = K_3$$

During the existence of this connection the non-homokinetic connection between the elements $E_1$ and S gives a resultant difference $(E_1-S)_r = K_1$. At this moment, in the circuit ES, $E_1$, S, D and ES, we have:

$$(ES-E_1)+(E_1-S)_r-(D-S)-(ES-D)_1=0$$
$$(D-S)=(ES-E_1)+(E_1-S)_r-(ES-D)_1$$

or (1F) $\qquad (D-S) = \Delta_{e1} + K_1 - K_3$ if there is put:

$$\Delta_{e1} = (ES-E_1)$$

This difference (D—S) will be maintained during the whole duration of the homokinetic connection between the elements D and S. During this connection the element D is given a non-homokinetic connection with the element $E_2$, which gives a resultant difference $(E_2-D)_r = K_2$, and gives between the elements ES and D, from (3A):

$$(ES-D)_2 = (ES-E_2) + K_2$$
(2F) $\qquad (ES-D)_2 = \Delta_{e2} + K_2$ if there is put:

$$\Delta_{e2} = (ES-E_2)$$

In addition, when the homokinetic connection between the elements D and S and the second homokinetic connection between the elements ES and D exist simultaneously, we have in the circuit ES, D, S, ES (Fig. 21):

$$(ES-D)_2 + (D-S) - (ES-S) = 0$$
(3F) $\qquad (ES-S) = (ES-D)_2 + (D-S)$

If the values of (1F) and (2F) are substituted in (3F), there is obtained:

$$(ES-S) = \Delta_{e2} + K_2 + \Delta_{e1} + K_1 - K_3$$
$$\Delta_s = \Delta_{e1} + \Delta_{e2} + K_1 + K_2 - K_3$$

by putting $$(ES-S) = \Delta_s$$
(4F) $\qquad \Delta_{e1} + \Delta_{e2} = \Delta_s - (K_1 + K_2 - K_3)$ This type of group enables an output difference to be obtained which is equal, except for a constant, to the sum of two input differences.

The diagrams of Figs. 22 to 26 show the movements of the elements in the case in which:

$$\Delta_{e1} + 7 = \Delta_{e2} + 11$$

Figure 22:
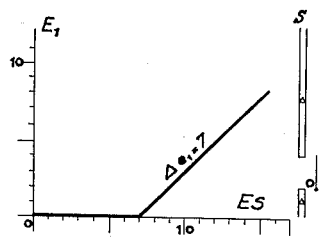

The diagram of Fig. 22 shows the movement of the element $E_1$ in relation to the movement of the element $E_s$. It can be seen that the element $E_1$ passes through zero when the element ES is at position 7, from which $\Delta_{e1} = 7$.

The element $E_1$ stops the element S in position zero, in its position from 4 to 2, passing through 0; in position 2, it starts up the element S from its position 0.

Figure 23:
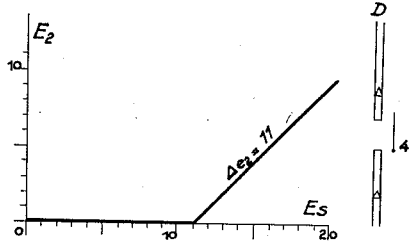

The diagram of Fig. 23 shows the movement of the element $E_2$ with respect to the element ES. It can be seen that the element $E_2$ leaves position zero when ES is at position 11, from which $\Delta_{e2} = 11$.

The element $E_2$ stops the element D in position 4, in its positions from 7 to 5, passing through 0; in position 5, it starts up the element D which is position 4.

Figure 24:
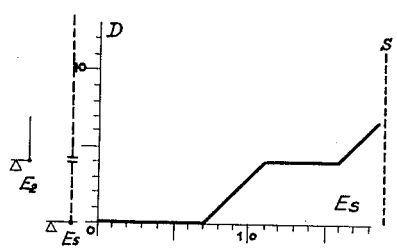

The diagram of Fig. 24 relates to the intermediate element D which is shown in the left-hand margin as being stopped on the unit $ES_1$ of the element ES in the position zero, and started up by the element ES when the latter passes to position 7 and driven by homokinetic connection until the element D reaches the position 4. In the position 4, the element D is stopped by the element $E_2$ and is started up by this element, after which it is driven in homokinetic connection by the element ES.

It is seen from the diagram that the stop in position 4 of the element D is effected between the positions 11 and 16 of the element ES. In the right-hand margin, it is seen that the element D is provided in all its positions with a means of homokinetic connection with S.

Figure 25:
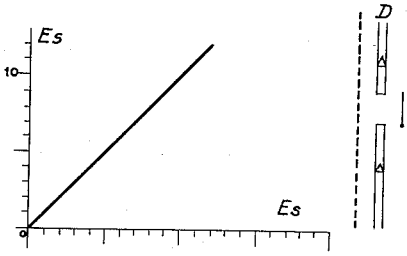
Figure 26:
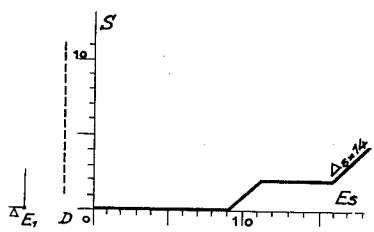

The diagram of Fig. 25 relates to the element ES or driving element which stops (see the right-hand margin) the element D in the zero position, in its positions from 9 to 7, passing through 0; in position 7, it starts up the element D from its position 0. The diagram of Fig. 26 is concerned with the output element S. In the left-hand margin, it is seen that the element S is stopped in the position 0 by the element $E_1$ which starts it up from that position, and that the element S is then driven by the element D.

The element S leaves position zero when ES in position 9 and stops in position 2 from positions 11 to 16 of ES, after which it leaves its position 2. This stopping of the element S is produced by its connection with the element D; this part of the movement of the element S thus reproduces that of the element D shown in Fig. 24. This constitutes an illustration of modulation in duration. The course and the duration of the impulse of the element S represent the modulation in position of the impulse of the element D which ensures the maintenance of the impulse of the element S.

It can thus be checked that for $K_1 = 2 - 0 = 2$, $$K_2 = 5-4 = 1 \text{ and } K_3 = 7-0 = 7$$
$$\Delta_{e1} + \Delta_{e2} = \Delta_s + (K_1 + K_2 - K_3)$$
$$7 + 11 = 14 - (2+1-7)$$

It should be observed that:

(a) The existence of $\Delta_{e1}$ is only necessary at the moment at which the connection ceases between the elements $E_1$ and S, at which the connection begins between the elements D and S.

(b) The existence of $\Delta_{e2}$ is only necessary at the moment at which the connection ceases between the elements $E_2$ and D, at which the second homokinetic connection begins between the elements ES and D.

(c) The existences of $\Delta_{e1}$ and $\Delta_{e2}$ do not therefore require to be simultaneous.

GROUP OF THE TYPE G

The group of this type is capable of effecting subtractions. It is similar to the group of the type F, except that on the element D, the order of succession of the connections is as follows:

Non-homokinetic connection with $E_2$;
First homokinetic connection with ES;
Non-homokinetic connection with ES;
Second homokinetic connection with ES.

The diagram is the same as that of the group F; an example of embodiment is shown in Fig. 20a.

The operation of this group is as follows:

During the first homokinetic connection between the elements ES and D, we have:

$$(ES-D)_1 = \Delta_{e2} + K_2 \text{ from (3A)}$$

and during the second homokinetic connection:

$$(ES-D)_2 = K_3$$

The relation (1F) is transformed to:

(1G) $\quad (D-S) = \Delta_{e1} + K_1 - \Delta_{e2} - K_2$

The Equation 2F is transformed to:

(2G) $\quad (ES-D)_2 = K_3$

The Equation 3F is obviously unchanged, and thus the Equation 4F becomes:

(4G) $\quad \begin{aligned}\Delta_s &= K_3 + \Delta_{e1} + K_1 - \Delta_{e2} - K_2, \text{ or:} \\ \Delta_{e1} - \Delta_{e2} &= \Delta_s - (K_1 - K_2 + K_3)\end{aligned}$ This type of group enables an output difference to be obtained which is equal, except for a constant, to the difference of two input differences.

The diagrams of Figs. 27 to 31 show the movements of the elements in the case in which $\Delta_{e1} = 7$ and $\Delta_{e2} = 8$.

Figure 27:
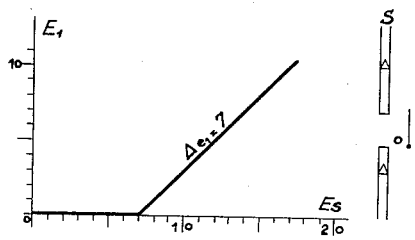

The diagram of Fig. 27 which refers to the element $E_1$, shows that this element leaves the position zero when the element ES is at position 7. The element $E_1$ stops the element S in position zero for its positions from 7 to 5, passing through 0; in position 5, it starts up the element S.

Figures 28, 31:
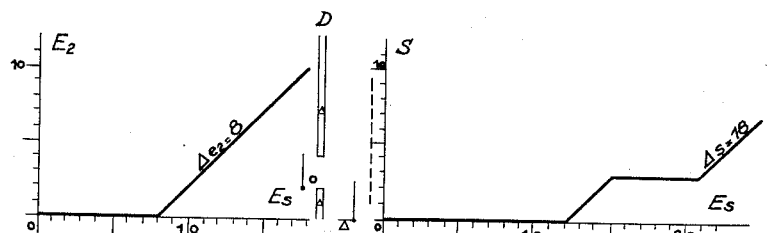

The diagram of Fig. 28 refers to the element $E_2$ and shows that this element leaves the position zero when the element ES is in position 8. The element $E_2$ stops the element D in the position zero, for its positions from 4 to 2, passing through 0; in position 2, it starts up the element D.

Figure 29:
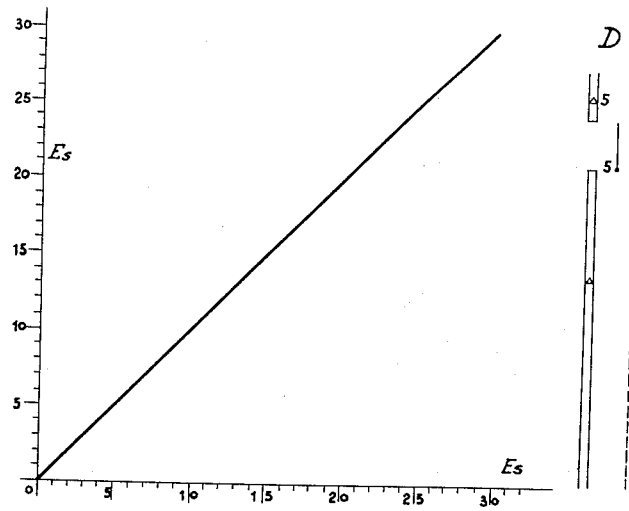

The diagram of Fig. 29 shows the action of the element ES on the element D. It can be seen from the right-hand margin that this element ES stops the element D in position 5, for its positions from 24 to 21, passing through 0, and that, in position 21, it starts up the element D, and that it can drive D, except at position 0 and 5 of D.

Figure 30:
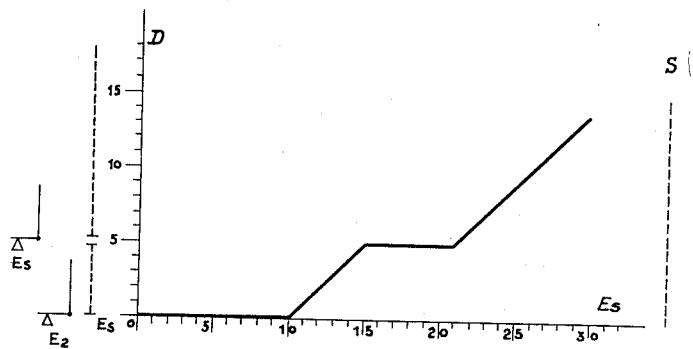

The diagram of Fig. 30 relates to the movement of the element D. It can be seen in the left-hand margin that the element D is stopped at zero by the element $E_2$ and is started up by this element when the element ES is at its position 10. The element D is then driven in homokinetic connection by the element ES up to the position 5, in which the element ES stops it and starts it again when the said element ES is at the position 21. The element D is then again driven by the element ES in homokinetic connection.

The element D (right-hand margin) is provided in all its positions with a homokinetic driving means for the element S.

Finally, the diagram of Fig. 31 which relates to the movement of the output element S with respect to the element ES, shows that the said element S is stopped by the element $E_1$ in position zero and is started up from this position by this latter element when the element ES passes to its position 12. The element S is then driven by the element D and follows the movement of the latter, which is shown in Fig. 30. For this reason, the element S stops at the position 3, in position 15 to position 21 of the element ES.

It can thus be checked that:

$$K_1 = 5 - 0 = 5;\ K_2 = 2 - 0 = 2;\ K_3 = 21 - 5 = 16$$

and that:

$$\Delta_{e1} - \Delta_{e2} = \Delta_s - (K_1 - K_2 + K_3)$$

or $$7 - 8 = 18 - (5 - 2 + 16)$$

The same observations can be made for the group of type G as for the group F in connection with the conditions of existence of $\Delta_{e1}$ and $\Delta_{e2}$.

The group-types which have just been described are only given by way of simple examples and have no limiting character. It will easily be understood that the combinations of the elements described above may vary for each particular case and for each application.

The practical construction of mechanical systems in accordance with the invention, which consists mainly in the manufacture of rotary elements and shafts intended to carry them, together with other driving members, is greatly facilitated by the provision of the groups described above.

It is possible to construct sub-assemblies comprising a number of groups of the same type or of different types, each sub-assembly carrying out a pre-determined function. Thus, it is possible to construct a sub-assembly composed, as shown symbolically in Fig. 32, of a number of groups of type A arranged in series.

In this sub-assembly, the element ES of the groups A is common to all the groups; it is the reference element. The output element of a group is the input element of the group following. Each revolution of the element ES corresponds to one cycle of operation of this sub-assembly.

The operation of this sub-assembly may be explained as follows:

$$\Delta_{s1} = \Delta_e + K$$
$$\Delta_{s2} = \Delta_{s1} + K_1$$
$$\Delta_{s3} = \Delta_{s2} + K_2$$

and therefore $$\Delta_{s3} = \Delta_e + K + K_1 + K_2$$

And for any particular output element $Sm$:

$$\Delta_{Sn} = \Delta_e + K + K_1 + K_2 + \ldots K_n - 1$$

$$\Delta_{Sn} = \Delta_e + \sum_{n-1}^{0} K$$

For any particular output element $Sm$:

$$\Delta_{Sn} = \Delta_e + \sum_{m-1}^{0} K$$

or again:

$$\Delta_{Sm} = \Delta_{Sn} + \sum_{m-1}^{0} K - \sum_{n-1}^{0} K$$

In the case in which the output elements $Sm$ and $Sn$ and the elements S intermediate between them are such that:

$$\sum_{m-1}^{n-1} K = QP$$

Q being a whole number and P being the number of positions of the element ES.

We shall have:

$$\Delta_{Sm} = \Delta_{Sn} + Q \text{ cycles}$$

that is to say:

$\Delta_{Sm} = \Delta_{Sn}$ (to the nearest whole number of revolutions)

$\Delta_{Sm}$ being produced in the Qth cycle, after the cycle in which $\Delta_{Sn}$ has been produced.

If three successive elements $Sn$, $Sn+1$ and $Sn+2$ are considered, it will be noted that the element $Sn+1$ should be in the position of connection with the element $Sn$ for all the cases in which this element $Sn$ is in a position to communicate an impulse to it; the impulse carried by the element $Sn+1$ before its arrival at the said position of connection has been transmitted to the element $Sn+2$; this difference may still be present on the element $Sn+2$ or it may have been transmitted to a following element.

P is the number of steps in the cycle and it is not necessary that the element ES should have the same number of positions; it is only necessary that it should be in a homokinetic relation with the progress of the cycle.

EXAMPLE OF APPLICATION OF A SUB-ASSEMBLY ACCORDING TO FIG. 32

*Recording and translation of a sequence of indications*

The sequence of indications is formed by a series of terms, each term being identified by its own value and its ordinal row in the series. A number is an example of a sequence of indications. The differences between the elements S and the element ES are conventionally applied to the representation of these terms.

Suppose a sub-assembly is considered, in which the sum of the values of K of two successive elements S is equal to one cycle. In this case, the term which has been carried in one cycle by an element $Sn$ will be carried by the element $Sn+2$ in the course of the cycle following: thus a term represented in the cycle C on the element E will be on the element $S_2$ in the cycle $C+1$ and on the element $S_4$ in the cycle $C+2$, and so on.

If there is introduced in each cycle a term on the element E, these successive terms will progress on the elements S. There is thus formed a sequence of terms, these terms being arranged in the sequence in the order in which they have been introduced on the element E.

The sequence of indications or data being thus represented, it can be caused to progress on the series of elements S by introducing at each new cycle a difference representing for example an indication of value zero. At each cycle, the sequence will progress by two elements S. A term represented at the beginning of the cycle by a element $Sn$ will be represented at the end of the cycle by an element $Sn+2$. This progression is called "translation."

If each of the odd or even elements S is provided so as to co-operate also by a momentary connection with the elements of another series of elements, the translation operates between these two series to produce an ordinal displacement of a row at each cycle of the element ES. The subassembly in question permits of the resolution without any displacement of elements, solely by their rotation, of the function of displacement of a sequence of indications, which function is usually carried out by a displaceable carriage, the said carriage being adapted to carry members which represent the sequence of indications.

EXAMPLE OF APPLICATION OF A SUB-ASSEMBLY ACCORDING TO FIG. 33

*Registration and repetition of an indication*

A further sub-assembly, shown diagrammatically in Fig. 33, provides a means of registration and repetition of an indication.

This sub-assembly is composed of a group of the type A and a group of the type B. On the diagram of this sub-assembly, the elements are identified in the following manner:

$S_1$ of the sub-assembly corresponds to E of the group type A;
ES of the sub-assembly corresponds to ES of the group type A;
$S_2$ of the sub-assembly corresponds to S of the group type A;
E of the sub-assembly corresponds to $E_2$ of the group type B;
$S_2$ of the sub-assembly corresponds to $E_1$ of the group type B;
$S_1$ of the sub-assembly corresponds to S of the group type B.
ES of ths sub-assembly corresponds to ES of the group type B.

The element ES is the reference element of the sub-assembly; each of its revolutions constitutes one cycle of the sub-assembly:

$\Delta_{e2}$ is the input difference ($ES-E$) which exists at least at the moment of the connection between the elements E and $S_1$.

$\Delta_{s1}$ is the difference ($ES-S_1$) caused by the connection in which the element $S_1$ is driven by the element $S_2$.

$\Delta_{s2}$ is the difference ($ES-S_1$) caused by the connection between the elements E and $S_1$.

$\Delta_{s3}$ is the difference ($ES-S_2$) produced by the connection in which the element $S_1$ drives the element $S_2$, when the difference $\Delta_{s2}$ exists between the elements $S_1$ and ES. In the group B, the correspondence of $\Delta_{s3}$ is $\Delta_{e1}$.

It is known from Equations 7B, 8B, and 9B, of group B, that:

(1) $\quad \Delta_{s2}=\Delta_{s3}+K_1=\Delta_{s1}$ if $\Delta_{s3}-\Delta_{e2} \geqslant K_2-K_1$ and (2) $\quad _{s2}\Delta=\Delta_{e2}+K_2$ if $\Delta_{s3}-\Delta_{e2} \leqslant K_2-K_1$ On the other hand, it is known from Equation 3A of the group type A that:

(3) $\quad \Delta_{s3}=\Delta_{s2}+K_3$
(4) $\quad \Delta_{s1}+\Delta_{s3}+K_1$

Two cases of operation can be distinguished:

(1) *Registration of a new difference (the case of Equation 2).*—The input difference $\Delta_{e2}$ is applied, which is to be introduced and which should satisfy Equation 2, which gives: First of all, on the element $S_1$: $\Delta_{s2}=\Delta_{e2}+K_2$ and then on the element $S_2$: $\Delta_{s3}=(\Delta_{e2}+K_2)+K_3$ (2) *Repetiton of the same difference, to the nearest constant (the case of Equation 1).*—Following the cycle of registration, there is found during the course of the first cycle of repetition: First of all, on the element $S_1$:

$$\Delta_{s2}=\Delta_{s1}=\Delta_{s3}+K_1=(\Delta_{e2}+K_2)+(K_3+K_1)$$

During the course of the second cycle, there is first of all found on $S_1$:

$$\Delta_{s2}=\Delta_{s1}=\Delta_{s3}+K_1=(\Delta_{e2}+K_2)+(K_3+K_1)+(K_3+K_1)$$

and then on the element $S_2$:

$$\Delta_{s3}=\Delta_{s2}+K_3=(\Delta_{e2}+K_2)+(K_3+K_1)+(K_3+K_1)+K_3$$

And during the course of an $n$th cycle of repetition: first of all on the element $S_1$:

$$\Delta_{s2}=\Delta_{s1}=(\Delta_e+K_2)+n(K_3+K_1)$$

and then, on the element $S_2$:

$$\Delta_{s3}=(\Delta_{e2}+K_2)+n(K_3+K_1)+K_3$$

If $(K_3+K_1)$ is equal to the number of steps, $\Delta_{s2}$ and $\Delta_{s3}$ increase at each cycle by a quantity equal to the number of steps of the cycle, which is also the number of positions of the element ES with respect to which these differences exist. At each cycle and to the nearest number of revolutions of the element ES, we shall have:

$$\Delta_{s2}=\Delta_{s1}=\Delta_{e2}+K_2$$

The different possible values of the indication to be registered and repeated will be made to correspond conventionally to values of $(\Delta_{e2}+K_2)$ which satisfy Equation 2. When one of these values exists, the system operates in accordance with the first case and registration takes place.

When the input element E receives a difference $\Delta_{e2}$ known as the driving difference in repetition, which satisfies Equation 1, the system functions in accordance with the second case of operation and repetition takes place.

Thus it is possible to record an indication which will be re-found at each cycle on the element $S_1$, as long as the element E sends to the element $S_1$ a difference of drive in repetition.

If the element $S_1$ is provided to drive an element of another group by momentary connection, it will be capable of transmitting at each cycle the indication which has been registered once only by the input element E. The element $S_2$ may act instead of the element $S_1$ or simultaneously to play this part in the transmission of the indication.

This application constitutes a repetition register.

Fig. 35 shows a further assembly, similar to the sub-assembly of Fig. 33 but comprising a number of groups of type A mounted in series, instead of one, as in the case of the first sub-assembly of Fig. 32. In this case, there is formed a repetition register, not now of a single indication but of a sequence of indications, each of the terms of which is successively repeated by each element S.

A further assembly may be constituted by a sub-assembly such as that of Fig. 33 and a group of type F or G. On the diagram shown in Fig. 34, the permanent connections between the output elements of the one and the input elements of the other are shown in double broken lines so as to clearly show the connections made between the sub-assembly and the group, these connections consisting of rigid connections or continuously-engaged gears.

To the nearest constants, we have:

$$\Delta_{e2} = \Delta_e$$

and $$\Delta_s = \Delta_{e1} + \Delta_e$$

in the case of the group of type F, and $$\Delta_s = \Delta_{e1} - \Delta_e$$

in the case of the group of type G.

Successive additions or subtractions can thus be obtained between an indication which is changed at each operation ($\Delta_{e1}$) and an indication which has been memorized or registered ($\Delta_{e2}$), that is to say operations of the form:

$$a+b, a-b$$
$$c+b, c-b$$
$$d+b, d-b$$
etc. etc.

In the particular case in which the result $\Delta_s$ is transmitted to the element $E_1$ by one or a number of groups of the type A, there is obtained addition or subtraction of the indication which has been registered or recorded, to or from the previous result, that is to say, operations of the form:

$$a+b, a-b$$
$$a+2b, a-2b$$
$$a+3b, a-3b$$
etc. etc.

EXAMPLE OF A DATA PROCESSING MECHANISM

It is not possible to describe all the mechanisms which can be formed with the elements, the groups and the sub-assemblies of the mechanical system in accordance with the invention which have just been described, as their number may be extremely great.

It is however necessary to describe by way of example, and without any sense of limitation, a mechanism obtained in this way and having the most simple form. This mechanism is intended to carry out the introduction and the displacement of a series of terms which, in the example chosen, are constituted by the numbers 0 to 9. It illustrates, in addition, a means of application of the sub-assembly shown in Fig. 32.

This mechanism comprises a keyboard, an inscription device, a coupling and driving device and a translating device.

KEYBOARD

The keyboard is formed by a set of ten keys 1 (see Fig. 36) carrying on the upper faces of their buttons the numbers forming a natural sequence of 0 to 9.

Each key 1 is guided by guides 2 and 3 formed respectively in the upper panel of the frame 4 of the mechanism and in a cross-member 5 fixed to the said frame. At its central part, each key is provided with a finger 6 which, when the key is brought into its lower position, as shown in Fig. 36, comes into abutment with a fixed comb 7 which limits the depression of the key.

Each key 1 is urged upwards by a tension spring 8 fixed to a pin 9 which is riveted or screwed on the lower part of the key and to a tenon 10 fixed on the frame 4. The travel of the key upwards is limited by the finger 6 which comes into contact with the frame 4, as shown in Fig. 37.

The pin 9 of each key is arranged on the key in such manner as to come into contact with the extremity $11_b$ of the corresponding pawl 11. This contact is maintained by the action of a tension spring 13 which causes the pivotal movement of the pawl 11 in the direction opposite to that of the arrow referring to this latter. This spring 13 is fixed to a lug $11_c$ of the pawl 11 and to a tenon 14 rigidly fixed to the frame 4.

A device adapted to prevent the depression of two or more keys at the same time has not been shown in these drawings. This may be of any known type.

The lateral projection $11_a$, of concave shape, has as its centre that of the fixed spindle 12 of the pawl 11, and is located in the same plane as a second pawl 15 which can turn freely on a fixed axis 16.

INSCRIPTION DEVICE

The pawl 15 is urged in the direction of the arrow associated with it by a tension spring 17 fixed to a lug $15_a$ of the said pawl and to a rod 18 fixed to the frame 4.

The pawl 15 is provided with a curved surface $15_b$ adapted to co-operate with the projection $11_a$ of the pawl 11. At its lower extremity, the pawl 15 is provided with a pin 19 which comes into contact with a cam 20 forming part of a member 21 which carries other members to be described later. This multiple member 21 is termed in the description which follows "an emitting member" because it is this member which emits the impulse corresponding to the indication introduced by the key which is depressed.

The pin 19 of the pawl 15 is, in addition, adapted to co-operate with a projection $22_a$ formed on a cam 22 which forms part of the emitting member 21. The latter can turn freely on a shaft 23, but when the pawl 15 is in the position of rest as shown in Fig. 37, the pin 19 ensures the stopping for both directions of rotation of the member 21 by coming between the surface $20_a$ of the cam 20 and the projection $22_a$ of the cam 22.

This cam 22 co-operates with a pin $24_a$ fixed to the extremity of a pawl 24 which pivots freely on a shaft 25 fixed to the frame 4. This pawl 24 is urged in the direction of the arrow associated with it, by means of a tension spring 26 fixed to a tenon 27 which is rigidly secured to the frame 4. It is guided in its movement by a shaft 28 passing through a port 29 with which it is provided.

The pin $24_a$ also co-operates with one of the teeth $30_a$ of a comb 30 common to all the keys. This comb 30 forms part of a further pawl 31 terminated by a stud $31_a$ adapted to engage in a notch $32_a$ of a disc 32 rigidly fixed to a shaft 33 which pivots in the frame 4.

The pawl 31 pivots freely on the shaft 28 and is subject to the action of a tension spring 34 fixed to a tenon 35 rigidly secured to the frame 4. The said spring tends to apply the stud $31_a$ of the lever against the disc 32 and to engage it in the notch $32_a$, in which position the said stud is shown in Fig. 36.

The pawl 24 is operated by a cam 36 keyed on a shaft 37 which is pivotally mounted in the frame 4. The cam 36 is fixed to a pinion 38 located in the same plane as a single tooth 39 carried by the core of the emitting member 21 referred to above.

The tooth 39 and the pinion 38, which also comprises a single tooth $38_a$, constitute an intermittent gear in which the stopping of the emitting member 21 in its reception position 0—and of all the members which it carries—is effected by a concave arc $39_a$ chamfered at the summit of the tooth 39 and supported against the circular smooth flank of the pinion 38.

All the members described above refer to a single key, but they are repeated for each of the other keys of the keyboard and are arranged in the same way, with the exception of the members 36 to 38. The said members are in fact arranged in a spiral on the shaft 37 and are staggered by one thirtieth of a revolution as a function of the value of the key. It is possible to mount them in any desired order, following the arrangement of the keys and the value of each of the keys, the orientation of each member 36 to 38 corresponding being suitably fixed.

The Fig. 36 shows by way of example the "zero" key and the corresponding locking of the member 36—38.

On this same figure are also shown the pinions 40 and 41, drawn in chain-dotted lines. The pinion 40 is provided with a normal set of thirty teeth and is mounted in free rotation on a shaft 42 pivotally mounted in the frame. The pinion 41 comprises a normal set of eighteen teeth and is rigidly fixed to a shaft 43 which is also pivoted in the frame. These pinions 40 and 41 are always in engagement with each other.

Fig. 36 also shows in chain-dotted lines the reading device of the mechanism. This device is formed by a series of drums 44 mounted in free rotation of a shaft 45. In the form of construction described, each drum forming part of the reading series can occupy eighteen positions but is only numbered for ten of these positions.

These figures appear in a window 46 formed on the frame 4 of the machine.

COUPLING AND DRIVING DEVICE FOR THE SHAFTS OF THE MECHANISM

The general arrangement of the coupling and driving device of the shafts of the mechanism is shown in Figs. 38 and 39.

The shaft 42 is driven in a uniform movement of rotation in any known manner by a source of motive power (not shown).

This rotation is transmitted to a shaft 47 through the medium of a pinion 48 keyed on the shaft 42 and in constant engagement with one of the units of a double intermediate pinion 49 having eighteen teeth and mounted to be freely rotatable on the shaft 43. This pinion engages in its turn and by its second unit with a pinion 50 rigidly fixed to the shaft 47.

The shafts 42 and 47 thus rotate in the same direction and in the ratio of 1/1.

The rotation of the shaft 42 is also transmitted to the shaft 37 through the medium of a second pinion 51 keyed on the said shaft 42 and which engages with a pinion 52 freely mounted on the shaft 33. This pinion engages with a pinion 53 mounted in free rotation on the shaft 23 and engaged on the other hand with a pinion 54 rigidly fixed on the shaft 37.

The shaft 37 is thus driven in the opposite direction to the driving shaft 42 and in the ratio of 1/1.

All the pinions are driven in rotation in the directions indicated by the arrows which are shown on Fig. 38.

In Figs. 36, 38 and 39, there are shown all the units of the emitting member 21, but the composition of this member is shown much more clearly in Figs. 40 and 41. Fig. 40 shows the member 21 in plan view, while Fig. 41 shows each of the members of which it is composed in the six transverse planes in which they are located.

In these Figures 40 and 41, there are shown in addition to the cam 20, the cam 22 and the tooth 39 referred to above, three pinions 55, 56 and 57 having special shapes.

The pinion 55, having originally eighteen teeth, only comprises fourteen teeth forming two groups of ten and of four teeth separated by cut-out portions which permit the free passage of a pinion 58 with which the said pinion 55 co-operates. The pinion 58 comprises thirty teeth and is keyed on the shaft 37. For this reason it can be rigidly fixed to the member 36—38.

The pinions 56 and 57 co-operate with two pinions 59 and 60 forming part of a member 61 shown in Figs. 42 and 43, of which they effect the starting-up with acceleration, and the stopping with deceleration, in accordance with the mode of operation described in French Patent No. 1,046,301 of December 11, 1951 and its Certificate of Addition No. 63,550 of December 3, 1952, having for its object "improvements in driving devices for intermittent motions."

The pinions 56 and 57 comprise teeth $56_a$ and $57_a$ respectively, by which they can stop the emitter member 21 for both its directions of rotation, by coming into contact with the pinions 59 and 60 of the member 61 which is locked on the shaft 33. Starting-up with acceleration of the member 61 by the emitter member 21 is carried out by a tooth $57_b$ formed on the pinion 57, and which co-operates with a tooth $60_a$ carried by the pinion 60 (see Fig. 44). A tooth $56_c$ carried by the pinion 56 of the member 21 effects the stopping with deceleration of the member 61 by acting on a tooth $59_a$ formed on the pinion 59 of the said member in accordance with the method described in the certificate of addition referred to above.

The pinions 56 and 57 are provided with clearances $56_d$, $57_d$, which when the members 21 are in the position of rest, permit the passage of the teeth $59_a$ and $60_a$ of the pinions 59 and 60, and in consequence, the rotation of the member 61, started up by the selected member 21.

In addition, the member 61 comprises two toothed pinions 62 and 63 co-operating in the ratio of 18/30 with two pinions 64 and 65 which form part of a member 66 shown in detail in Fig. 45. These pinions 64 and 65 comprise a toothed segment $64_a$—$65_a$, a stabilisation arc $64_b$—$65_b$, and a starting tooth $65_c$ which co-operates with the tooth $63_c$ of the pinion 63 of the member 61.

In addition to the pinions 64 and 65, the member 66 comprises the pinion 40 referred to previously and a toothed pinion 67 which co-operates with a toothed pinion 68 rigidly fixed to the double pinion 49 which has a continuous movement of rotation on the shaft 43. Starting from an accelerated start, this pinion 67 carries out the drive of the member 66 up to its decelerated stopping, and in the ratio of 1/1.

The member 66 is a single member. On the contrary, the shaft 33 carries rigidly fixed thereon and for each key other than the key 0, members which are fast with it and which are only composed of pinions 59 and 60 for accelerated starting and decelerated stopping.

TRANSLATOR DEVICE

The translator device is formed by a chain of members, of which Figs. 46 and 47 show only a part. Fig. 46 shows the members in elevation and Fig. 47 shows the members cut along the transverse planes in which they are placed along the shafts 43 and 47 which carry them exclusively.

It will be recalled at this point that the shaft 47 is given a continuous movement of rotation by the pinion 50 which is keyed on it, the double pinion 49 turning freely on the shaft 43, the pinion 48 engaging with the said pinion 49 and being keyed on the shaft 42 which receives the general driving movement of the mechanism from a suitable external source of power.

The shaft 43 is driven in an intermittent manner, as has been previously described, by the pinion 41 which is rigidly fixed to it, the pinion 41 being engaged with the pinion 40 of 66 which receives the impulses or indications from one of the members 61 originating from one of the emitting members 21 actuated by the key 1 which corresponds to the said member.

To the double pinion 49 is rigidly fixed a pinion 69 having a special profile and provided with a driving tooth $69_a$ (see Fig. 47) co-operating with a tooth $70_a$ forming part of a member 70 which rotates freely on a shaft 47. This member comprises in addition a pinion 71 having originally eighteen teeth but actually provided with seventeen only. The teeth 71$_a$ located on either side of the stopping clearance created by the missing tooth are chamfered to the form of a concave arc which has as its radius that of the tips of the teeth of a pinion 72 keyed on a shaft 43 and having a full complement of eighteen teeth.

The member 70 comprises a further pinion 73 provided with a single tooth 73$_a$, the tip of which is chamfered in the form of a concave stopping surface 73$_b$. The element 70 finally comprises a further pinion 44$_a$ (see Fig. 46) with a full set of teeth engaging with a pinion 44$_b$ which is rigidly fixed to the first reading drum 44.

The pinion 73 with a single tooth 73$_a$ co-operates with a similar pinion 74 forming part of an element 75 which turns freely on the shaft 43. The pinion 74 comprises a single tooth 74$_a$ which is chamfered to form a concave stopping surface 74$_b$.

The element 75 also comprises a pinion 76 originally having a set of eighteen teeth but actually provided with sixteen only. The end teeth of the set are chamfered in the form of a concave stopping surface 76$_a$. This pinion 76 co-operates with a pinion 77 having a full set of thirty teeth, and keyed on the driving shaft 47.

The element 75 finally comprises a pinion 78 with a single tooth 78$_a$, the tip of which is chamfered to form a concave surface 78$_b$, in exactly the same way as the pinions 73 and 74, but the orientation is the reverse of these last two pinions. The pinion 78 co-operates with an identical pinion 79 with a single tooth 79$_a$ provided with a stopping surface 79$_b$ and forming part of an element 80 which turns freely on the shaft 47.

The element 80 comprises also a pinion 81 having originally eighteen teeth but actually provided with seventeen only and formed with a stopping surface 81$_a$, that is to say similar to the pinion 71. This pinion 81 co-operates with a pinion 82 having a full set of eighteen teeth and keyed on the shaft 43.

The element 80 also comprises a pinion 83 identical with the pinion 73, that is to say comprising a single tooth 83$_a$ formed with a stopping surface 83$_b$ which co-operates with the pinion 74$^1$ of an element 75$^1$, identical with the element 75. Finally, the element 80 comprises a pinion 44'$_a$ with a complete set of teeth engaging with a pinion 44'$_b$ rigidly fixed to the second drum 44' of the reading device.

The chain of the elements of the translator device is extended in the same manner, elements 75, 75$^1$, 75$^2$, . . . which alternate on the shaft 43 with elements 80, 80$^1$, 80$^2$, . . . arranged on the shaft 47 and co-operating with pinions 77, 77$^1$, . . . and 82, 82$^1$, . . . keyed respectively on the shaft 47 and 43.

The pinions 44$_a$, 44'$_a$, 44"$_a$, and the drums 44, 44', 44" . . . have not been shown on Fig. 47 in order to avoid excessive complication of the drawing.

The mechanism which has just been described and which constitutes the first form of embodiment given by way of example, operates in the following way.

OPERATION OF THE MECHANISM

Depression of the key 1 (Fig. 36) until the finger 6 comes up against the comb 7 produces rotation of the pawl 11 about its axis 12 as a result of the action of the pin 9 of the key on the extremity 11$_b$ of the said pawl. The latter, in its position of rest shown in Fig. 37, prevented the pawl 15, by means of its projection 11$_a$, from following the pull applied by the spring 17, but during its rotation, the projection 11$_a$ escapes from the surface 15$_b$ of the pawl and frees the latter which pivots about its axis 16 due to the action of the spring 17.

The pin 19 of the pawl 15, which locked the emitter element 21 in its position of rest by co-operating with the cam 20 and the projection 22$_a$ of the cam 22, tends to cause the emitter element 21 to rotate in the direction of the arrow indicated in Fig. 36, by acting on the slope 20$_a$ of the cam 20 which forms part of the said element. The tooth 39 of the latter is then brought into the path of the tooth 38$_a$ of the element 38 keyed on the shaft 37 which is driven in a continuous manner by the driving means, but the drive of the element 21 by the element 38 is only possible at the moment when the pin 24$_a$ of the lever 24 frees the cam 22 fixed to the element 21 and thus no longer opposes the completion of the movement of the element 21 under the action of the pawl 15.

The cam 36 keyed on the driving shaft 37 acts, at a moment in its cycle, to cause the lever 24 to pivot about its shaft 25 and produce the release of the element 21 in accordance with the programme carried by the driving element 38, thus ensuring the synchronisation of the arrival of the tooth 39 with the driving movement. The tooth 38$_a$ of the element 38 then starts up the emitter element 21 by acting on the tooth 39 of this element, and the said emitter element starts at a moment of the driving cycle which corresponds to the figure carried by the key which is depressed.

The cam 22, forming part of the element 21, engages the pin 24$_a$ of the lever 24 during the rotation of the said element. The pin 24$_a$, by acting on the tooth 30$_a$ of the comb 30 carried by the pawl 31, causes the latter to pivot about its axis 28. The stud 31$_a$ leaves the notch 32$_a$ of the disc 32, which is keyed on the shaft 33 and thus frees this disc.

The emitter element 21 which has been started up by the tooth 38 and driven by the driving pinion 58 co-operating with the partly-toothed pinion 55 of the said element, stops the element 61 by the teeth 59$_a$ and 60$_a$ of the pinions 59 and 60 of this latter until it reaches the position at which it can start up the said element 61 by means of its tooth 57$_b$. This stopping ensures the continuation of the locking of the shaft 33 after the pawl 31 has moved away. After its accelerated start, this member 61 is driven in rotation by its pinions 62 and 63 engaged with the pinions 64 and 65 of the element 66 which is itself driven through its pinion 67 by the pinion 68 rigidly fixed to the double pinion 49 to which a continuous rotation is imparted by the driving means.

The element 21 carries out its complete rotation in accordance with a pre-determined programme, depending on the profile of the pinions 56 and 57 of the said element which co-operate with the pinions 59 and 60 of the element 61, as will be explained later.

During the course of its rotation, the emitter element 21, returning to its position of rest under the action of the driving pinion 58 acting on the pinion 55 of the element, re-sets the pawl 15 by means of its cam 20. Returning to its position of rest, the pawl 15 enables the pawl 11 to return to its starting position under the action of the spring 13, on the condition however that the key 1 has not been kept depressed. One or a number of repetitions of the inscription of a number is, in fact, made possible by keeping the key depressed. As the extremity 11$_b$ of the pawl 11 is supported against the pin 9 of the key which is held down, the said pawl is not able to return to its position of rest and cannot ensure the locking of the pawl 15 by its projection 11$_a$. For this reason, all the members operate again in the manner which has been described above until the key has been released.

In order to understand more clearly the chain of operations carried out by the mechanism described above, and forming one of the many applications of the invention, and before proceeding further with the explanation of the operation of the devices of which it is composed, it is necessary to have recourse to diagrams in which the movements of each of the elements, and the co-operation between some of them, can be clearly illustrated.

The diagrams used have been prepared in the same manner as those which enabled the analysis to be made of the movements of the elements constituting the group-types, of which certain types are to be formed in the present mechanism, cited by way of example.

Figure 48:
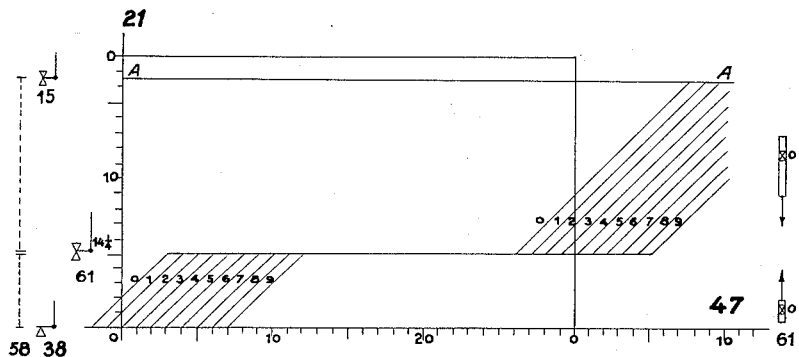

If reference is again made to the operation of the members composing the keyboard, the movement of the emitter element 21 with respect to the movement of the driving shaft 47 can be illustrated by the diagram shown in Fig. 48.

The element 21 is stopped in the position 0 by the pawl 15 and the pinion 38. After starting up under the action of the pinion 38, the element 21, driven by the pinion 58, moves from the position 0 to the position 5¼. During this rotation, it starts up and accelerates the element 61. This latter element, during the course of its rotation, stops and fixes for both directions the element 21 in the position 5¼ for the period of 23 steps of the shaft 47, and then starts it up from the said position. The element 21, driven by the pinion 58, moves from the position 5¼ to the position A known as "the position of rest," in which it is stopped and maintained for both directions by the pawl 15. The said element is thus ready to make a fresh registration.

As has been shown in the right-hand margin of the diagram, the selected element 21 stabilises the corresponding element 61 in the position 0 for both direction, starts up the said element with acceleration and stops it with deceleration.

Figure 49:
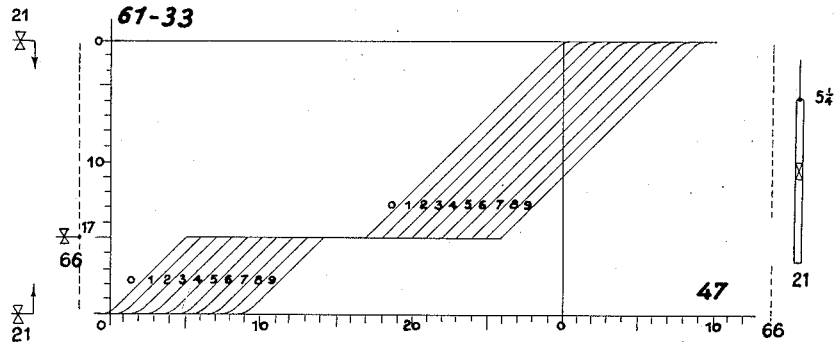
Figure 50:
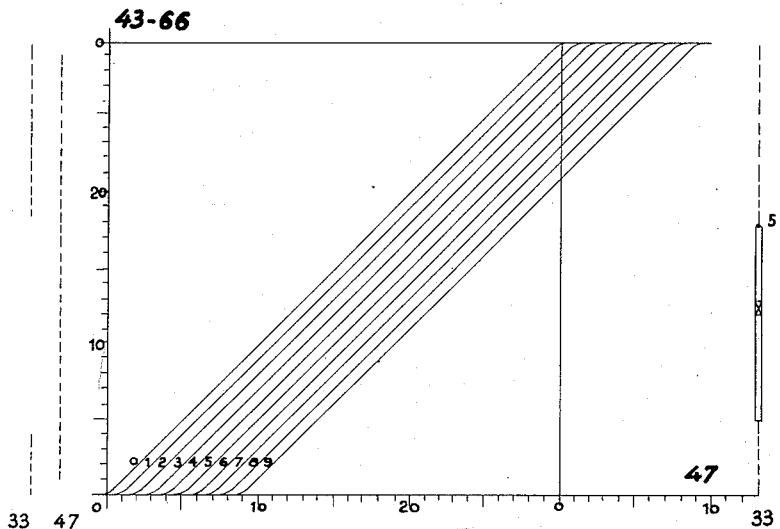

The diagram shown in Fig. 49 also illustrates this interdependence of the elements 21 and 61. This diagram shows the movement of the element 61, that is to say of the shaft 33, with respect to that of the shaft 47.

The element 61 is thus started up with acceleration by the element 21 and then, after having passed through five steps of the driving cycle, it is stabilised for both directions by the element 66 which keeps it stopped during twelve steps of the said cycle and starts it up when the latter reaches the position 17. The element 61 engages with the element 66 from steps 17 to 5, passing through 0 of this latter, and thus ensures its stopping and its starting from the position 0.

The element 66 is then stopped with deceleration at the end of the revolution. The element 61 which is rigidly fixed to the shaft 33 has thus imparted to it the movement described. Stopping is then effected of the shaft 33 at 0 by the co-operation of the pawl 31 and the disc 32 which is keyed on the shaft 33; the stud 31$_a$ of the pawl 31 passes into the notch 32$_a$ at the position 0 of the shaft 33, the pawl 31 being returned by its spring 34.

The indication given in the right-hand margin also shows that the element 61 stops the element 21 for both directions when the latter is in its position 5¼. The element 61, having received an impulse emitted by the corresponding element 21 transmits it to the element 66 which drives the pinion 41 keyed on the shaft 43 through the pinion 40 and in consequence, the impulse is transmitted to the shaft 43.

The values introduced are thus translated by the starting of the shaft 43, in accordance with a scale of reference associated with the driving movement. Conventionally, the figure 0 coincides with zero of this scale, the figure 1 with the graduation 1, and so on up to the figure 9 which coincides with the graduation 9, as shown by the diagram of the shaft 43 in Fig. 50.

The elements 72, 82, 82$^1$, 82$^2$ (Figs. 46 and 47) which are keyed on this shaft 43 have thus the same movement of rotation as this shaft, whilst the shaft 47, driven by the reference driving movement, transmits this to the elements 50, 77, 77$^1$, 77$^2$ . . . which are regidly fixed thereto.

The pinion 50 engaging with the pinion of the element 49 transmits the driving movement to this element.

In Fig. 47, the various elements are shown in the positions resulting from the inscription of the figures 7 and 5 of the number 750 which is proposed to be introduced into the mechanism. The figure 7 is carried by the member 80 and the figure 5 by the member 70. The register of the figures inscribed is preserved in the translator device by engagement of the members 70 and 70 with the shaft 43, through the medium of the pinions 72, 82, 82$^1$, . . . which are keyed on the said shaft.

In Fig. 46, the number 750 which is visible on the reading drums 44, 44', . . . is supposed to have been already formed, whilst in Fig. 47, the figures 7 and 5 still only occupy respectively the row of the tens and the units. When the shaft 43 starts up with the figure zero at the end of the rotation of the said shaft, the figure 7 will be in the hundreds row, the figure 5 will be in the tens row and the figure zero in the row of units.

Figure 51:
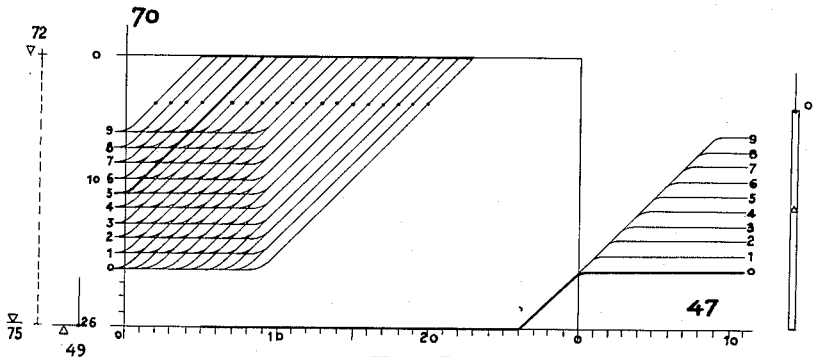

The diagram of Fig. 51 shows the movement of the element 70 with respect to that of the shaft 47 on which it rotates freely. In the left-hand margin, it can be seen that the said element 70 is driven on the one hand by the pinion 72 rigidly fixed to the shaft 43, and on the other hand, by the element 49.

The pinion 72 drives the element 70 in a homokinetic coupling and assists in the stabilisation at zero of the said element 70 in the direction opposite to that of the arrow. The element 49 stabilises the element 70 at 0 for the normal direction of rotation of this element from the position 5 to the position 26 of the shaft 47.

It can be seen from the diagram that the element 70 starts up from the position 9 which represents the figure 5, at the zero of the scale of reference (the shaft 43 starting up at zero for the figure zero). At its position 15, the element 70 starts up the element 75 through the tooth 73$_a$ of its pinion 73 which co-operates with the tooth 74$_a$ of the pinion 74 of the said element 75. As indicated in the right-hand margin of the diagram, it should be observed that the element 75 is stopped in its zero position by the element 70, that is to say by co-operation of the pinions 73 and 74.

Figure 52:
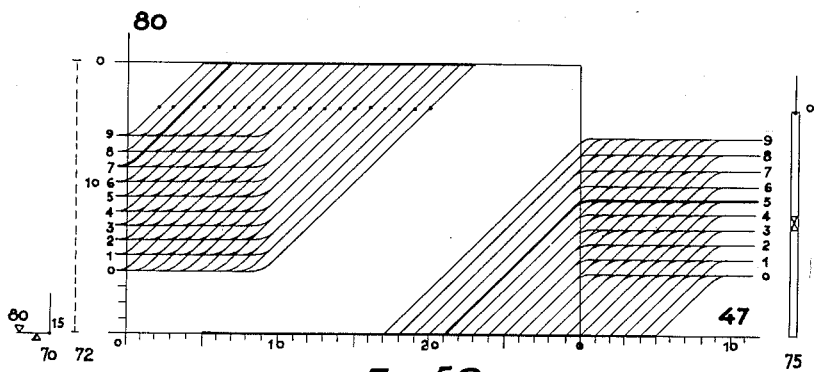
Figure 53:
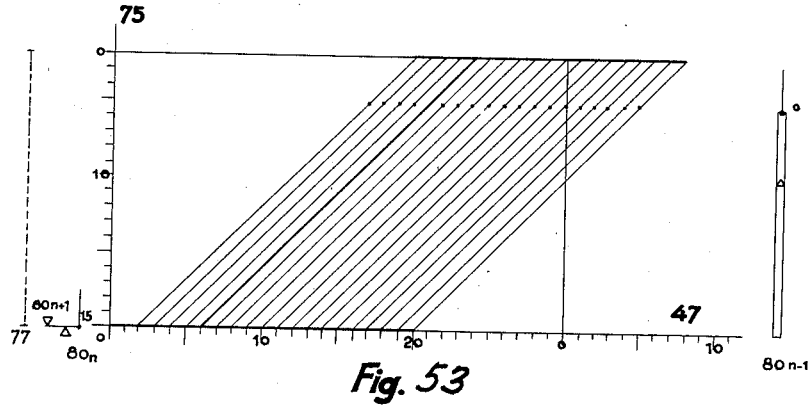

When it arrives at its position 15, the element 75 in its turn starts up the element 80 which has been stopped at zero on the pinions 78 and 74$^1$ of the elements 75 and 75$^1$, and the pinion 82 then drives the said element in homokinetic coupling, as shown in the diagram of Fig. 52, when the shaft is in its position 21 (the shaft 43 having started with 0).

During this time, the element 75 returns to its position zero in which it is stopped for the normal direction of rotation by the tooth 74$_a$ of its pinion 74 and the pinion 73 of the element 70, and in the reverse direction by the tooth 78$_a$ of its pinion 78 and the pinion 79 of the element 80. This element 75 is thus ready for a further operation.

In the same way, the element 70 is stopped at zero for the normal direction of its rotation, by its tooth 70$_a$ and the pinion 69 of the element 49, and in the reverse direction by the tooth 73$_a$ of its pinion 73 and the pinion 74 of the element 75.

When the shaft 47 reaches the position 26, the said element 69 starts up the element 70 which engages by its pinion 71 with the pinion 72, that is to say with the shaft 43 which, at this moment of starting, is also at the position 26. When the shaft 43 is stopped at the position zero, it will have passed through 30—26=4 steps, and the element 70 will actually be stopped at the position 4 which represents the value zero, as shown in the diagram of Fig. 54 at the second cycle of the element 70.

The element 80 which has engaged with the shaft 43 at the position 21 of this latter, will therefore have passed through 30—21=9 steps. When the shaft 43 is stopped, the element 80 is stopped at the position 9 which represents the figure 5. The figure 0 is then correctly located in the units row, the figure 5 has passed from the units row to the tens row and in the same way, the figure 7 has been transferred from the tens row to the hundreds row.

Figure 54:
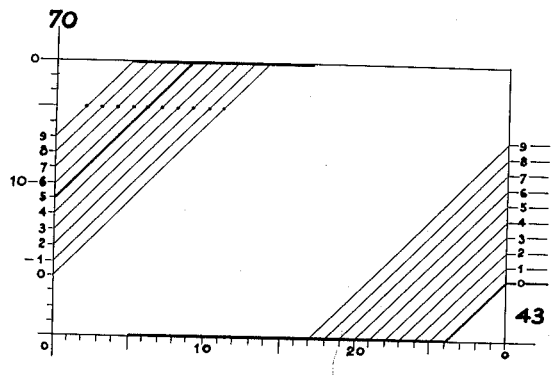
Figure 55:
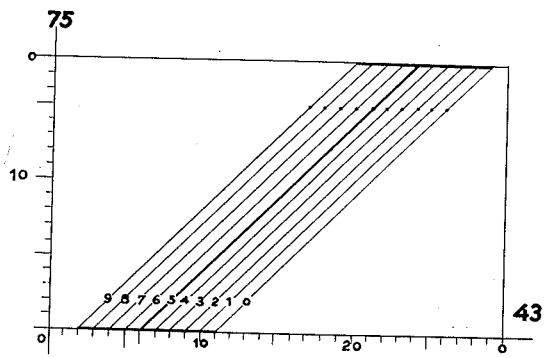
Figure 56:
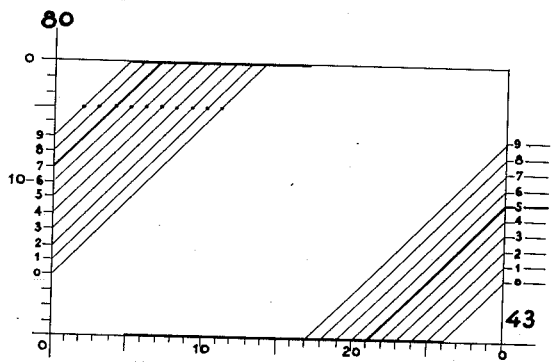

In a more general way, the transfer from a row $n$ to the row $n+1$ can be made clear with the help of the diagrams of Figs. 54, 55 and 56, which show respectively the movements of the elements 70, 75 and 80 with respect to the movement of the shaft 43, taken as a scale of reference. If the element 80 is considered, having a row $n$, stopped with the shaft 43, for example at the position 6 which represents the figure 2, when the shaft 43 starts up, the element $80_n$ starts up. At its position 15, the element $80_n$ in its turn starts up the element $75_n$ common to the rows $n$ and $n+1$ which are located in the zero position.

The element $75_n$ thus starts up with the figure 2 which was located in the row $n$ and it transmits this figure 2 to the row $n+1$ by starting up to the position 15 the element 80, in the $n+1$ row, which was on the zero position. During this period, in the same manner, the row $n$ receives the figure from the row $n-1$.

All the positions of the elements 70, 80, $80^1$ . . . are transmitted by pinions $44_a$, $44'_a$, $44''_a$, . . . rigidly fixed to the said elements 70, 80, $80^1$, . . ., to the reading drums 44, 44', 44'', . . ., through the medium of the pinions $44_b$, $44'_b$, $44''_b$, . . ., fixed to the said drums. The said drums constitute the de-coding system of this mechanism.

This method of transmission of the result is only given by way of simple example and can obviously be replaced by any other mechanical, electrical or electronic device placed following the mechanism described above.

The output elements 70, 80, $80^1$, . . ., may also cooperate with input elements belonging to a further mechanism constructed following the mechanical system in accordance with the invention and following after that which has just been described.

It will further be understood that this mechanism described by way of example and without any implied limitation, expresses only one simple form of construction of a mechanism in accordance with the invention.

On the contrary, the invention may be given a very great number of applications and may result in the most varied forms of mechanism, of which it is not possible to give the description.

What I claim is:

1. A mechanical system for the processing of numerically coded information, comprising a main rotary driving member; at least one rotary controlled element; and at least two independently rotatable rotary controlling elements cooperating with each said rotary controlled element; at least one of said controlling elements carrying a locking means and an excitation means and being capable of being rotated by an external impulse, another of said controlling elements being driven by said main rotary driving member and carrying driving means for rotating said controlled element; said controlled element carrying stopping means cooperating with said locking means of said one controlling element to stop the rotation of said controlled element in a predetermined position of the latter and form a non-homokinetic coupling, the said controlled element also carrying detecting means cooperating with said excitation means at a predetermined position of the rotation of said one controlling element to move said controlled element from said stopped position; said controlled element further carrying means cooperating with the aforesaid driving means for rotating said controlled element in homokinetic movement between successive stopped positions of said controlled element.

2. A mechanical system as claimed in claim 1, said locking means comprising a cylindrical surface on said one controlling element, said stopping means comprising a projection on said controlled element chamfered so as to form a concave stopping surface adapted to engage said cylindrical surface.

3. A mechanical system as claimed in claim 1, said detecting means comprising a projection on said controlled element having at least one flank formed to be engaged and moved by at least one flank of said excitation means carried by at least one of said controlling elements.

4. A mechanical system as claimed in claim 3, said excitation means comprising a projection on said one controlling element having a profile operative upon said projection on said controlled element to accelerate said controlled element in the course of moving it from stopped position.

5. A mechanical system as claimed in claim 1, said locking means on said one controlling element comprising a projecting surface portion thereof having a profile operative upon said stopping means to decelerate said controlled element in the course of stopping the same.

6. In a mechanism for processing numerically coded information, a group of cooperating rotary elements adapted to receive information in the form of angular displacements of some of said elements and to emit related information as resultant angular displacements of an output element, said group including a rotary driving element, a rotary output element engageable with said driving element so as to be rotated by it in homokinetic connection, said output element having at least one angular position in which it is stopped out of driving engagement with said driving element, and a rotary input element rotatable independently of said driving element and carrying means engageable with cooperating means on said output element when said output element is in said stopped position and said input element reaches a predetermined angular position to rotate said output element from said stopped position into driving engagement with said driving element.

7. In a mechanism for processing numerically coded information, a group of rotary elements mounted for rotation on parallel axes and cooperating peripherally to receive information in the form of angular displacements of some of said elements and to emit related information as resultant angular displacements of an output element, said group including a rotary driving element having a peripheral driving portion, a rotary output element having an interrupted peripheral portion engageable with said driving portion so as to be rotated by it in homokinetic connection, said output element having at least one angular position in which an interruption of its said peripheral portion disengages it from said driving portion, said output element carrying also a member for stopping its rotation and a detection member engageable to start it in rotation, and an input element rotatable independently of said driving element and having a peripheral surface normally positioned in the path of said stopping member to stop the rotation of said output element at an angular position thereof as aforesaid, said input element carrying also an excitation member engageable with said detection member by rotation of said input element while said output element is in a position at which it is stopped by said stopping member to move said output element out of that position and into driving engagement with said driving portion.

8. In a mechanism for processing numerically coded information, a group of rotary elements mounted for rotation on parallel axes and cooperating peripherally to receive information in the form of angular displacements of some of said elements and to emit related information as resultant angular displacements of an output element, said group including a rotary driving gear, a rotary output element comprising a gear adapted to be driven peripherally by said driving gear and cut away peripherally at one location so that in one of its angular positions it is out of driving engagement with said driving gear, said output element also comprising at least one radial projection located in a fixed angular relation to said cut away location, and a rotary input element rotatable independently of said driving element to transmit an impulse to said output element, said input element comprising a peripheral surface engageable by said projection to stop said output element in said one position, said input element also comprising peripheral means operable upon said projection through an angular displacement of said input element while said output element is in said one position to rotate said output element out of said one position into driving engagement with said driving gear.

9. In a mechanism for processing numerically coded information, a group of rotary elements mounted for rotation on parallel axes and cooperating peripherally to receive information in the form of angular displacements of some of said elements and to emit related information as resultant angular displacements of an output element, said group including a rotary driving gear, a rotary output element comprising a gear adapted to be driven peripherally by said driving gear and cut away peripherally so that at a plurality of its angular positions it is out of driving engagement with said driving gear, said output element also comprising a plurality of radial projections fixed thereon at different angular locations correspondingly respectively to said angular positions, and a plurality of rotary input elements rotatable independently of each other and independently of said driving element to transmit impulses to said output element, each of said input elements comprising a peripheral surface engageable by one of said projections to stop said output element at a corresponding one of its angular positions, each of said input elements also comprising peripheral means operable upon a said projection through an angular displacement of the input element while said output element is at its corresponding stopped position to rotate said output element out of said position into driving engagement with said driving gear.

10. In a mechanism as claimed in claim 9, said surface and said means of at least one of said input elements comprising, respectively, a cylindrical surface and a singly toothed extension thereof which is operable upon the one of said projections that is engageable with said surface of the same input element, to rotate said output element out of its corresponding stopped position.

11. In a mechanism as claimed in claim 10, said surface and said means of another of said input elements comprising, respectively, a cylindrical surface and a multiply toothed extension thereof any one of the teeth which is selectively operable upon the projection that is engageable with said surface of said other input element, by selective angular displacement of said other input element, to rotate said output element out of its corresponding stopped position.

12. In a mechanism as claimed in claim 10, said surface and said means of each of said input elements comprising, respectively, a cylindrical surface and a singly toothed extension thereof as aforesaid.

13. In a mechanism as claimed in claim 12, the respective cylindrical surfaces of said input elements having starting points at locations spaced by different angular distances from the respective toothed extensions thereof so that any one of a plurality of different angular displacements may be represented by the selective operation of any one of said input elements.

14. In a mechanism for processing numerically coded information, a group of rotary elements mounted for rotation on parallel axes and cooperating peripherally to receive information in the form of angular displacements of some of said elements and to emit related information as resultant angular displacements of an output element, said group including a rotary driving element comprising a plurality of driving gears rotatable together on a common axis, a plurality of rotary output elements each comprising a gear adapted to be driven peripherally by one of said driving gears and cut away peripherally at one location so that at one of its angular positions it is out of driving engagement with said driving element, each of said output elements also comprising at least one radial projection located in a fixed angular relation to said cut away location, and a rotary input element comprising a plurality of input gears rotatable together on a common axis and independently of said driving element to transmit impulses to said output elements, each of said input gears comprising a peripheral surface engageable by a said projection of one of said output elements to stop the corresponding output element in its said one position and peripheral means operable upon a said projection of said one output element, through an angular displacement of said input element while said one output element is in its stopped position, to rotate said one output element out of its stopped position into driving engagement with said driving element.

15. In a mechanism for processing numerically coded information, a group of rotary elements mounted for rotation on parallel axes and cooperating peripherally to receive information in the form of angular displacements of some of said elements and to emit related information as resultant angular displacements of an output element, said group including a rotary driving element comprising for rotation together on a common axis a driving gear and a control member having a cylindrical surface and a toothed extension at a limit of said surface; a driven rotary element comprising for rotation together on a common axis a gear adapted to be driven peripherally by said driving gear and cut away peripherally so that at a plurality of its angular positions it is out of driving engagement with said driving gear, a plurality of radial projections fixed at different angular locations corresponding respectively to said angular positions, and a second driving gear; a rotary output element comprising for rotation together on a common axis a gear adapted to be driven peripherally by said second driving gear and cut away peripherally at one location so that in one of its angular positions it is out of driving engagement with said second driving gear, and at least one radial projection located in a fixed angular relation to said one location; and a plurality of rotary input elements rotatable independently of each other and independently of said driving element; one of said input elements having a cylindrical surface engageable by a said projection of said output element to stop said output element in said one position, and a toothed extension operable upon a said projection of said output element through an angular displacement of said one input element while said output element is at its stopped position to rotate said output element out of its stopped position into driving engagement with said second driving gear; another of said input elements having a cylindrical surface engageable by one of said projections of said driven element to stop said driven element in one of its said angular positions, and a toothed extension operable upon a said projection of said driven element through an angular displacement of said other input element while said driven element is at its said one position to rotate said driven element out of its said one position into driving engagement with said driving gear; another of said projections of said driven element being engageable with said cylindrical surface of said control member to stop said driven element in another of its said angular positions, said toothed extension of said control member being operable upon a said projection of said driven element through rotation of said driving element while said driven element is in its said other position to rotate said driven element out of its said other position into driving engagement with said driving gear.

16. In a mechanism for processing numerically coded information, a plurality of interconnected groups of cooperating rotary elements adapted to receive information in the form of angular displacements of some of said elements and to emit related information as resultant angular displacements of an output element, each of said groups including a rotary driving element, a rotary output element engageable with said driving element so as to be rotated by it in homokinetic connection, said output element having at least one angular position in which it is stopped out of driving engagement with said driving element, and a rotary input element rotatable independently of said driving element and carrying means engageable with cooperating means on said output element when said output element is in said stopped position and said input element reaches a predetermined angular position to rotate said output element from said stopped position into driving engagement with said driving element; said output element of one of said groups including a part constituting the rotary input element of another of said groups.

References Cited in the file of this patent

UNITED STATES PATENTS

| | | |
|---|---|---|
| 1,160,337 | Spurgeon | Nov. 16, 1915 |
| 1,179,358 | Heuser | Apr. 11, 1916 |
| 1,641,615 | Berk | Sept. 6, 1927 |
| 1,791,675 | Kottman | Feb. 10, 1931 |
| 2,273,652 | Maxson et al. | Feb. 17, 1942 |
| 2,370,919 | Rouan | Mar. 6, 1945 |
| 2,464,959 | Andren | Mar. 22, 1949 |
| 2,689,085 | Avery | Sept. 14, 1954 |
| 2,797,589 | Chaveneaud | July 2, 1957 |
| 2,824,691 | Gelling | Feb. 25, 1958 |
| 2,838,236 | Chaney | June 10, 1958 |